US009660482B2

(12) United States Patent
Fujita et al.

(10) Patent No.: US 9,660,482 B2
(45) Date of Patent: May 23, 2017

(54) POWER CONVERSION DEVICE WITH MOMENTARY VOLTAGE DROP COMPENSATION

(71) Applicant: FUJI ELECTRIC CO., LTD., Kawasaki-shi (JP)

(72) Inventors: Satoru Fujita, Akishima (JP); Ryuji Yamada, Hachioji (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 377 days.

(21) Appl. No.: 14/477,974

(22) Filed: Sep. 5, 2014

(65) Prior Publication Data

US 2015/0042166 A1 Feb. 12, 2015

Related U.S. Application Data

(63) Continuation of application No. PCT/JP2012/004393, filed on Jul. 6, 2012.

(30) Foreign Application Priority Data

Apr. 2, 2012 (JP) ................................ 2012-083935

(51) Int. Cl.
*H02J 9/00* (2006.01)
*H02M 5/297* (2006.01)
(Continued)

(52) U.S. Cl.
CPC ................ *H02J 9/00* (2013.01); *H02M 1/10* (2013.01); *H02M 1/14* (2013.01); *H02M 5/297* (2013.01);
(Continued)

(58) Field of Classification Search
CPC ...... H02J 9/00; H02J 2009/063; H02M 7/483; H02M 1/10; H02M 5/4585; H02M 1/14;
(Continued)

(56) References Cited

U.S. PATENT DOCUMENTS 5,889,661 A * 3/1999 Tamura .............. H02M 5/4585 363/37
6,084,785 A * 7/2000 Kunisada ............... H02M 1/32 363/127
(Continued)

FOREIGN PATENT DOCUMENTS

JP 2001-119952 A 4/2001
JP 2010-098892 A 4/2010
(Continued)

*Primary Examiner* — Jared Fureman
*Assistant Examiner* — Michael Warmflash
(74) *Attorney, Agent, or Firm* — Rabin & Berdo, P.C.

(57) ABSTRACT

A power conversion device able to supply a constant load voltage even when the voltage of a 3-phase alternating current power supply fluctuates. A series circuit formed of switching element Q1 and switching element Q2 and a series circuit formed of switching element Q3 and switching element Q4 are connected to both ends of direct current power supply series circuit 3 formed of direct current power supply Psp and direct current power supply Psn, a bidirectional switch element S1 is connected between alternating current output terminals U and R, a bidirectional switch element S2 is connected between alternating current output terminal U and neutral terminal O, a bidirectional switch element S3 is connected between alternating current output terminal W and neutral terminal O, a bidirectional switch element S4 is connected between alternating current output terminal W and terminal T, and alternating current output terminals V and terminal S are connected.

25 Claims, 18 Drawing Sheets

(51) Int. Cl.

| | |
|---|---|
| ***H02M 11/00*** | (2006.01) |
| ***H02M 1/14*** | (2006.01) |
| ***H02M 7/537*** | (2006.01) |
| ***H02M 1/10*** | (2006.01) |
| ***H02M 5/458*** | (2006.01) |
| ***H02M 7/483*** | (2007.01) |
| *H02J 9/06* | (2006.01) |

(52) U.S. Cl.
CPC ......... *H02M 5/4585* (2013.01); *H02M 7/483* (2013.01); *H02M 7/537* (2013.01); *H02M 11/00* (2013.01); *H02J 2009/063* (2013.01); *Y10T 307/609* (2015.04)

(58) Field of Classification Search
CPC ...... H02M 7/537; H02M 5/297; H02M 11/00; Y10T 307/609
USPC ........................................................... 307/63
See application file for complete search history.

(56) References Cited

U.S. PATENT DOCUMENTS

| | | | | |
|---|---|---|---|---|
| 9,276,489 | B2 * | 3/2016 | Fujita | H02M 5/4585 |
| 2003/0052544 | A1 * | 3/2003 | Yamamoto | B66B 5/02 307/66 |
| 2011/0012543 | A1 * | 1/2011 | Takizawa | B60L 3/003 318/139 |
| 2012/0044728 | A1 | 2/2012 | Yatsu et al. | |
| 2013/0235625 | A1 | 9/2013 | Yamada | |

FOREIGN PATENT DOCUMENTS

| | | | |
|---|---|---|---|
| JP | 2012-044824 | A | 3/2012 |
| WO | WO-2012/067167 | A1 | 5/2012 |

* cited by examiner

FIG. 2A
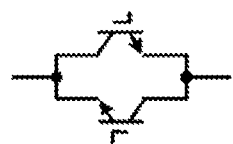
FIG. 2B
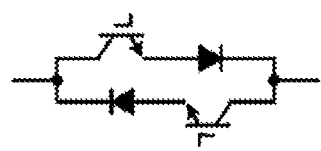
FIG. 2C
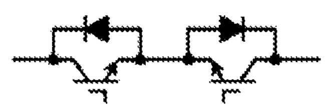
FIG. 2D 200
201
FIRST LINE VOLTAGE COMMAND GENERATOR CIRCUIT
202
VOLTAGE DETERMINATION CIRCUIT
203
PULSE WIDTH COMMAND SELECTOR CIRCUIT
204
205
PULSE DISTRIBUTOR CIRCUIT
206
CARRIER SIGNAL GENERATOR CIRCUIT
207
Vuv*
δ
α
Sc
Hon
Lon
G1
G2
Gs1
Gs2
Vrs
Vp
Vn

FIG. 4

| FIRST LINE VOLTAGE COMMAND (Vuv*) | ALTERNATING CURRENT POWER SUPPLY VOLTAGE (Vrs) | Vrs AND Vuv* COMPARISON | δ (REGION) | α (PULSE WIDTH COMMAND) | ELEMENT SELECTION | | |
|---|---|---|---|---|---|---|---|
| | | | | | H ARM | L ARM | OFF-STATE ARM |
| Vuv* ≧ 0 | Vrs < 0 | — | 1 | Vuv* / Vp | Q1 | S2 | Q2, S1 |
| | Vrs ≧ 0 | Vuv* > Vrs | 2 | (Vuv*−Vrs) / (Vp−Vrs) | Q1 | S1 | Q2, S2 |
| | | Vuv* ≦ Vrs | 3 | Vuv* / Vrs | S1 | S2 | Q1, Q2 |
| Vuv* < 0 | Vrs < 0 | Vuv* ≧ Vrs | 4 | Vuv* / Vrs | S1 | S2 | Q1, Q2 |
| | | Vuv* < Vrs | 5 | (Vuv*−Vrs) / (Vn−Vrs) | Q2 | S1 | Q1, S2 |
| | Vrs ≧ 0 | — | 6 | Vuv* / Vn | Q2 | S2 | Q1, S1 |

FIG. 11

| FIRST LINE VOLTAGE COMMAND (Vuv*) | ALTERNATING CURRENT POWER SUPPLY VOLTAGE (Vrs) | Vrs AND Vuv* COMPARISON | δ (REGION) | α (PULSE WIDTH COMMAND) | ELEMENT SELECTION | | |
|---|---|---|---|---|---|---|---|
| | | | | | H ARM | L ARM | OFF-STATE ARM |
| Vuv* ≧ 0 | Vrs < 0 | — | 1 | Vuv* / Vp | Q1 | S2 | Q2, S1 |
| | Vrs ≧ 0 | Vuv* > Vrs | 2 | (Vuv*−Vrs) / (Vp−Vrs) | Q1 | S1 | Q2, S2 |
| | | Vuv* ≦ Vrs | 3 | Vuv* / Vrs | S1 | S2 | Q1, Q2 |
| Vuv* < 0 | Vrs < 0 | Vuv* ≧ Vrs | 4 | Vuv* / Vrs | S1 | S2 | Q1, Q2 |
| | | Vuv* < Vrs | 5 | (Vuv*−Vrs) / (Vn−Vrs) | Q2 | S1 | Q1, S2 |
| | Vrs ≧ 0 | — | 6 | Vuv* / Vn | Q2 | S2 | Q1, S1 |
| \|Vuv*−Vrs\| < ΔVuv* | | | 7 | 1.0(100%) | S1 | — | Q1, Q2, S2 |

POWER CONVERSION DEVICE WITH MOMENTARY VOLTAGE DROP COMPENSATION

CROSS-REFERENCE TO RELATED APPLICATIONS

This application is a continuation application of International Application number PCT/JP2012/004393, filed on Jul. 6, 2012 and designating the United States. Furthermore, this application claims the benefit of foreign priority of Japanese application 2012-083935, filed on Apr. 2, 2012. The disclosures of these earlier applications are hereby incorporated herein by reference.

TECHNICAL FIELD

The present invention relates to a power conversion device that generates a predetermined 3-phase alternating current voltage using the voltages of a 3-phase alternating current power supply and a direct current power supply. More specifically, the invention relates to a momentary voltage drop compensation device and uninterruptible power supply device wherein it is possible to supply a stable voltage to a load even when a 3-phase alternating current power supply voltage fluctuation or a 3-phase alternating current power supply interruption occurs.

BACKGROUND ART

The device shown in FIG. 18 is a known power conversion device of the above kind. This power conversion device compensates for 3-phase alternating current power supply voltage fluctuation, and supplies a stable 3-phase alternating current voltage to a load. The power conversion device is such that a 3-phase alternating current power supply and a load are V-connected, and a predetermined 3-phase alternating current voltage is generated using the voltage of the 3-phase alternating current power supply and a direct current voltage generated from this voltage.

In the drawing, 1 is a 3-phase alternating current power supply, 21 and 22 are capacitors, 3*u* and 3*w* are converter circuits, 4*u* and 4*w* are inverter circuits, 5 is a filter circuit, 6 is a 3-phase load, and K1 to K3 are switching means.

The 3-phase alternating current power supply 1 includes terminals R, S, and T that output an R-phase, S-phase, and T-phase voltage. The capacitor 21 is connected between the terminal R and terminal S of the 3-phase alternating current power supply 1. The capacitor 22 is connected between the terminal S and terminal T of the 3-phase alternating current power supply 1.

The converter circuit 3*u* has as main components a circuit wherein switching elements Qu and Qx are connected in series, a circuit wherein capacitors Cpu and Cnu are connected in series, a bidirectional switch element Su, and a reactor Lu. The series circuit of the switching elements Qu and Qx is connected in parallel with the series circuit of the capacitors Cpu and Cnu. A connection point of the capacitor Cpu and capacitor Cnu is connected via the switching means K1 to the terminal R of the 3-phase alternating current power supply 1. One end of the capacitor Cnu is connected via the switching means K3 to the terminal S of the 3-phase alternating current power supply 1. The bidirectional switch element Su is connected between a connection point of the switching elements Qu and Qx and a connection point of the capacitors Cpu and Cnu. One end of the reactor Lu is connected to a connection point of the switching elements Qu and Qx, and the other end is connected via the switching means K3 to the terminal S of the 3-phase alternating current power supply 1.

A positive side terminal of the series circuit of the capacitors Cpu and Cnu is connected to a terminal Pu that outputs a positive voltage of the converter circuit 3*u*. A negative side terminal of the series circuit of the capacitors Cpu and Cnu is connected to a terminal Nu that outputs a negative voltage of the converter circuit 3*u*. A connection point of the capacitor Cpu and capacitor Cnu is connected to a terminal Ou that outputs a neutral point voltage of the converter circuit 3*u*.

The inverter circuit 4*u* has as main components a circuit wherein switching elements Q1 and Q2 are connected in series and a bidirectional switch element S1. The series circuit of the switching elements Q1 and Q2 is connected to the terminal Pu and terminal Nu of the converter circuit 3*u*. The bidirectional switch element S1 is connected between a connection point of the switching elements Q1 and Q2 and the terminal Ou of the converter circuit 3*u*. A connection point of the switching elements Q1 and Q2 is connected to a terminal U, which is for the inverter circuit 4*u* to output an alternating current voltage.

The switching elements Q1 and Q2 and the bidirectional switch element S1 are configured of semiconductor elements, such as IGBTs (Insulated Gate Bipolar Transistors), such that a turn on/turn off operation can be carried out at a frequency that is sufficiently high with respect to the frequency of the 3-phase alternating current power supply 1.

The converter circuit 3*w* has as main components a circuit wherein switching elements Qw and Qz are connected in series, a circuit wherein capacitors Cpw and Cnw are connected in series, a bidirectional switch element Sw, and a reactor Lw. As the converter circuit 3*w* has a circuit configuration symmetrical to that of the converter circuit 3*u* across a line connecting the terminal S of the 3-phase alternating current power supply 1 and an alternating current output terminal V, a description of the connection relationship of each component will be omitted.

The inverter circuit 4*w* has as main components a circuit wherein switching elements Q3 and Q4 are connected in series and a bidirectional switch element S4. As the inverter circuit 4*w* too, in the same way, has a circuit configuration symmetrical to that of the inverter circuit 4*u* across a line connecting the terminal S of the 3-phase alternating current power supply 1 and the alternating current output terminal V, a description of the connection relationship of each component will be omitted. A connection point of the switching elements Q3 and Q4 is connected to a terminal W, which is for the inverter circuit 4*w* to output an alternating current voltage.

According to the heretofore described circuit configuration, the converter circuit 3*u* is such that each of the capacitors Cpu and Cnu is charged to an equal voltage using a line voltage Vrs between the terminal R and terminal S of the 3-phase alternating current power supply 1. Further, the converter circuit 3*u* maintains the voltage of the capacitors Cpu and Cnu at a predetermined voltage higher than the amplitude value of the line voltage Vrs.

The converter circuit 3*u* outputs a line voltage Vuv between the alternating current output terminals U and V, using the positive and negative voltages of the series circuit of the capacitors Cpu and Cnu and the neutral point voltage. The line voltage Vuv is a voltage that is the positive and negative voltages of the series circuit of the capacitors Cpu and Cnu superimposed on the line voltage Vrs. The fundamental waveform of the line voltage Vuv has a predetermined voltage amplitude in accordance with a voltage command.

In the same way, the converter circuit 3_w_ is such that each of the capacitors Cpw and Cnw is charged to an equal voltage using a line voltage Vts between the terminal S and terminal T of the 3-phase alternating current power supply 1. Further, the converter circuit 3_w_ maintains the voltage of the capacitors Cpw and Cnw at a voltage higher than the amplitude value of the line voltage Vts.

The converter circuit 3_w_ outputs a line voltage Vwv between the alternating current output terminals V and W, using the positive and negative voltages of the series circuit of the capacitors Cpw and Cnw and the neutral point voltage. The line voltage Vwv is a voltage that is the positive and negative voltages of the series circuit of the capacitors Cpw and Cnw superimposed on the line voltage Vts. The fundamental waveform of the line voltage Vwv has a predetermined voltage amplitude in accordance with a voltage command. Also, the line voltage Vwv is regulated to a phase deviating 120 degrees with respect to the line voltage Vuv.

The power conversion device is such that the amount of voltage superimposed on the line voltages Vrs and Vts is adjusted when the voltage of the 3-phase alternating current power supply 1 fluctuates, thus maintaining the line voltages Vuv and Vwv at predetermined values.

Also, the power conversion device is such that the switching means K1 to K3 are opened when the 3-phase alternating current power supply 1 is interrupted. Also, the power conversion device operates so that predetermined line voltages Vuv and Vwv are output using the voltage of the series circuit of the capacitors Cpu and Cnu and the voltage of the series circuit of the capacitors Cpw and Cnw.

The heretofore described power conversion device is disclosed in JP-A-2012-44824.

SUMMARY OF INVENTION

However, the power conversion device shown in FIG. 18 is such that the switching elements Q1 to Q4 operate at the voltages of the capacitors Cpu, Cnu, Cpw, and Cnw respectively. Further, the voltage of each capacitor is greater than the amplitude value of the line voltages Vrs and Vts. Consequently, there is a problem in that there is an increase in switching loss caused by the switching elements Q1 to Q4 carrying out turn on/turn off operations.

Also, the power conversion device is such that when the 3-phase alternating current power supply 1 is interrupted, means for detecting the interruption is necessary. Also, the power conversion device is such that the switching means K1 to K3 are necessary for disconnecting the 3-phase alternating current power supply 1 and converter circuits 3_u_ and 3_w_.

Further, when the switching means K1 to K3 are configured of semiconductor elements, there is a problem in that conduction loss occurs due to current flowing through the semiconductor elements. Meanwhile, when the switching means K1 to K3 are configured of mechanical switches, there is a problem in that it is not possible to instantaneously switch the control operation for outputting voltage when the 3-phase alternating current power supply 1 is interrupted.

The invention has been contrived in order to resolve the problems of this kind of heretofore known technology. That is, an object of the invention is to provide a power conversion device wherein power loss can be reduced. Also, an object of the invention is to provide a power conversion device such that, even when a 3-phase alternating current power supply voltage fluctuation occurs or a 3-phase alternating current power supply interruption occurs, it is possible to output a predetermined alternating current voltage without switching the control operation for outputting voltage.

In order to achieve the heretofore described objects, a first embodiment to which the invention is applied is a V-connected power conversion device that outputs a 3-phase alternating current voltage based on first and second line voltage commands. The power conversion device has as inputs voltage of a 3-phase alternating current power supply, including first to third terminals for outputting first to third phase voltages, and voltage of a direct current power supply series circuit formed by a first direct current power supply and second direct current power supply being connected in series, wherein a neutral terminal, which is a series connection point of the first direct current power supply and second direct current power supply, is connected to the third terminal of the 3-phase alternating current power supply, and outputting a 3-phase alternating current voltage. Further, the power conversion device has as a first line voltage a voltage selected in accordance with the first line voltage command from a first voltage group formed of four levels of voltage, those being a zero voltage with the potential of the neutral terminal as a reference, a positive voltage of the direct current power supply series circuit, a negative voltage of the direct current power supply series circuit, and a voltage of the first terminal of the 3-phase alternating current power supply, and outputting the first line voltage to a first alternating current output terminal. Furthermore, the power conversion device has as a second line voltage a voltage selected in accordance with the second line voltage command from a second voltage group formed of four levels of voltage, those being the zero voltage with the potential of the neutral terminal as a reference, the positive voltage of the direct current power supply series circuit, the negative voltage of the direct current power supply series circuit, and a voltage of the second terminal of the 3-phase alternating current power supply, and outputting the second line voltage to a second alternating current output terminal. Furthermore, the power conversion device has a voltage of the third terminal of the 3-phase alternating current power supply being output to a third alternating current output terminal.

The power conversion device has the first line voltage command synchronized with the voltage of the first terminal with respect to the third terminal of the 3-phase alternating current power supply. Furthermore, the second line voltage command is synchronized with the voltage of the second terminal with respect to the third terminal of the 3-phase alternating current power supply.

Alternatively, the first line voltage command is asynchronous with the voltage of the first terminal with respect to the third terminal of the 3-phase alternating current power supply. Furthermore, the second line voltage command is asynchronous with the voltage of the second terminal with respect to the third terminal of the 3-phase alternating current power supply.

In the power conversion device the positive voltage of the direct current power supply series circuit and the negative voltage of the direct current power supply series circuit are greater than the amplitude value of the first line voltage command and the amplitude value of the second line voltage command. Furthermore, the first line voltage command and second line voltage command have the same amplitude value, and have a phase difference of 120 degrees.

The power conversion device includes a first inverter circuit that outputs the first line voltage to the first alternating current output terminal and a second inverter circuit that outputs the second line voltage to the second alternating current output terminal.

Furthermore, the first inverter circuit is formed of a first switching element series circuit wherein first and second switching elements are connected in series and connected to both ends of the direct current power supply series circuit, and a series connection point thereof is connected to the first alternating current output terminal, a first bidirectional switch element of which one end is connected to the first alternating current output terminal and the other end is connected to the first terminal of the 3-phase alternating current power supply, and a second bidirectional switch element of which one end is connected to the first alternating current output terminal and the other end is connected to the third terminal of the 3-phase alternating current power supply. Furthermore, the second inverter circuit is formed of a second switching element series circuit wherein third and fourth switching elements are connected in series and connected to both ends of the direct current power supply series circuit, and a series connection point thereof is connected to the second alternating current output terminal, a third bidirectional switch element of which one end is connected to the second alternating current output terminal and the other end is connected to the second terminal of the 3-phase alternating current power supply, and a fourth bidirectional switch element of which one end is connected to the second alternating current output terminal and the other end is connected to the third terminal of the 3-phase alternating current power supply.

In the power conversion device the cycles of the first and second line voltage commands are divided among control periods having a predetermined duration and which are consecutive. Furthermore, in each of the control periods, the first line voltage is configured of a first voltage and a second voltage selected in accordance with the first line voltage command from among the voltages included in the first voltage group, and the second line voltage is configured of a third voltage and a fourth voltage selected in accordance with the second line voltage command from among the voltages included in the second voltage group. Furthermore, in each of the control periods, the first inverter circuit outputs each of the first voltage and second voltage in a complementary way for a predetermined duration to the first alternating current output terminal, and the second inverter circuit outputs each of the third voltage and fourth voltage in a complementary way for a predetermined duration to the second alternating current output terminal.

The cycles of the first and second line voltage commands are divided among control periods having a predetermined duration and which are consecutive. Furthermore, in each of the control periods, the first line voltage is configured of a first voltage, among the voltages included in the first voltage group, whose absolute value is equal to or greater than the absolute value of the first line voltage command and whose value is nearest to the value of the first line voltage command, and a second voltage, among the voltages included in the first voltage group, whose absolute value is smaller than the absolute value of the first line voltage command and whose value is nearest to the value of the first line voltage command. Furthermore, in each of the control periods, the second line voltage is configured of a third voltage, among the voltages included in the second voltage group, whose absolute value is equal to or greater than the absolute value of the second line voltage command and whose value is nearest to the value of the second line voltage command, and a fourth voltage, among the voltages included in the second voltage group, whose absolute value is smaller than the absolute value of the second line voltage command and whose value is nearest to the value of the second line voltage command. Furthermore, in each of the control periods, the first inverter circuit outputs each of the first voltage and second voltage in a complementary way for a predetermined duration to the first alternating current output terminal, and the second inverter circuit outputs each of the third voltage and fourth voltage in a complementary way for a predetermined duration to the second alternating current output terminal.

The output time of the first voltage is fixed based on the first line voltage command, the first voltage, and the second voltage, while the output time of the second voltage is a time that is the output time of the first voltage subtracted from the time of the control period. Furthermore, the output time of the third voltage is fixed based on the second line voltage command, the third voltage, and the fourth voltage, while the output time of the fourth voltage is a time that is the output time of the third voltage subtracted from the time of the control period.

The output time of the first voltage is a time corresponding to a value obtained by dividing the voltage difference between the first line voltage command and second voltage by the voltage difference between the first voltage and second voltage, while the output time of the second voltage is a time that is the output time of the first voltage subtracted from the time of the control period. Also, the output time of the third voltage is a time corresponding to a value obtained by dividing the voltage difference between the second line voltage command and fourth voltage by the voltage difference between the third voltage and fourth voltage, while the output time of the fourth voltage is a time that is the output time of the third voltage subtracted from the time of the control period.

The average value of the first line voltage is equivalent to the average value of the first line voltage command in each control period. Furthermore, the average value of the second line voltage is equivalent to the average value of the second line voltage command in each control period.

In order to achieve the heretofore described objects, a second embodiment to which the invention is applied is a Y-connected power conversion device that outputs a 3-phase alternating current voltage based on first to third phase voltage commands. The power conversion device has as inputs voltage of a 3-phase alternating current power supply, including first to third terminals for outputting first to third phase voltages, and voltage of a direct current power supply series circuit formed by a first direct current power supply and second direct current power supply being connected in series, wherein a neutral terminal, which is a series connection point of the first direct current power supply and second direct current power supply, is connected to the third terminal of the 3-phase alternating current power supply, and outputting a 3-phase alternating current voltage. Further, the power conversion device has as a first phase voltage a voltage selected in accordance with the first phase voltage command from a third voltage group formed of four levels of voltage, those being a zero voltage with the potential of the neutral terminal as a reference, a positive voltage of the direct current power supply series circuit, a negative voltage of the direct current power supply series circuit, and a voltage of the first terminal of the 3-phase alternating current power supply. Furthermore, the power conversion device has as a second phase voltage a voltage selected in accordance with a second phase voltage command from a fourth voltage group formed of four levels of voltage, those being the zero voltage with the potential of the neutral terminal as a reference, the positive voltage of the direct current power supply series circuit, the negative voltage of the direct current power supply series circuit, and a voltage of the second terminal of the 3-phase alternating current power supply. Furthermore, the power conversion device has as a third phase voltage a voltage selected in accordance with a third phase voltage command from a fifth voltage group formed of four levels of voltage, those being the zero voltage with the potential of the neutral terminal as a reference, the positive voltage of the direct current power supply series circuit, the negative voltage of the direct current power supply series circuit, and a voltage of the third terminal of the 3-phase alternating current power supply. Furthermore, the first phase voltage is output to a first alternating current output terminal, the second phase voltage is output to a second alternating current output terminal, and the third phase voltage is output to a third alternating current output terminal.

The first phase voltage command is synchronized with the first phase voltage of the 3-phase alternating current power supply, the second phase voltage command is synchronized with the second phase voltage of the 3-phase alternating current power supply, and the third phase voltage command is synchronized with the third phase voltage of the 3-phase alternating current power supply. Alternatively, the first phase voltage command is asynchronous with the first phase voltage of the 3-phase alternating current power supply, the second phase voltage command is asynchronous with the second phase voltage of the 3-phase alternating current power supply, and the third phase voltage command is asynchronous with the third phase voltage of the 3-phase alternating current power supply.

The positive voltage of the direct current power supply series circuit and the negative voltage of the direct current power supply series circuit are greater than the amplitude value of the first to third phase voltage commands. Furthermore, in the power conversion device the first to third phase voltage commands have the same amplitude value, and each has a phase difference of 120 degrees.

The power conversion device includes a first inverter circuit that outputs the first phase voltage to the first alternating current output terminal, a second inverter circuit that outputs the second phase voltage to the second alternating current output terminal, and a third inverter circuit that outputs the third phase voltage to the third alternating current output terminal.

The first inverter circuit is formed of a first switching element series circuit wherein first and second switching elements are connected in series and connected to both ends of the direct current power supply series circuit, and a series connection point thereof is connected to the first alternating current output terminal, a first bidirectional switch element of which one end is connected to the first alternating current output terminal and the other end is connected to the first terminal of the 3-phase alternating current power supply, and a second bidirectional switch element of which one end is connected to the first alternating current output terminal and the other end is connected to the neutral terminal of the direct current power supply series circuit. Furthermore, the second inverter circuit is formed of a second switching element series circuit wherein third and fourth switching elements are connected in series and connected to both ends of the direct current power supply series circuit, and a series connection point thereof is connected to the second alternating current output terminal, a third bidirectional switch element of which one end is connected to the second alternating current output terminal and the other end is connected to the second terminal of the 3-phase alternating current power supply, and a fourth bidirectional switch element of which one end is connected to the second alternating current output terminal and the other end is connected to the neutral terminal of the direct current power supply series circuit. Furthermore, the third inverter circuit is formed of a third switching element series circuit wherein fifth and sixth switching elements are connected in series and connected to both ends of the direct current power supply series circuit, and a series connection point thereof is connected to the third alternating current output terminal, a fifth bidirectional switch element of which one end is connected to the third alternating current output terminal and the other end is connected to the third terminal of the 3-phase alternating current power supply, and a sixth bidirectional switch element of which one end is connected to the third alternating current output terminal and the other end is connected to the neutral terminal of the direct current power supply series circuit.

The power conversion device further includes a 3-phase filter circuit wherein a circuit formed of a reactor and capacitor connected in series is Y-connected to the first to third alternating current output terminals. Further, the neutral terminal of the direct current power supply series circuit is connected to a neutral point of the 3-phase filter circuit, and is connected to a neutral point of a 3-phase capacitor Y-connected to the first to third terminals of the 3-phase alternating current power supply.

Further, in the power conversion device the neutral terminal of the direct current power supply series circuit is connected to a neutral terminal of the 3-phase alternating current power supply and a neutral terminal of a 3-phase load.

The cycles of the first to third phase voltage commands are divided among control periods having a predetermined duration and which are consecutive. Furthermore, in each of the control periods of the power conversion device, the first phase voltage is configured of a first voltage and second voltage selected in accordance with the first phase voltage command from among the voltages included in the third voltage group, the second phase voltage is configured of a third voltage and fourth voltage selected in accordance with the second phase voltage command from among the voltages included in the fourth voltage group, and the third phase voltage is configured of a fifth voltage and sixth voltage selected in accordance with the third phase voltage command from among the voltages included in the fifth voltage group. Further, in each of the control periods, the first inverter circuit outputs each of the first voltage and second voltage in a complementary way for a predetermined duration to the first alternating current output terminal, the second inverter circuit outputs each of the third voltage and fourth voltage in a complementary way for a predetermined duration to the second alternating current output terminal, and the third inverter circuit outputs each of the fifth voltage and sixth voltage in a complementary way for a predetermined duration to the third alternating current output terminal.

The cycles of the first to third phase voltage commands are divided among control periods having a predetermined duration and which are consecutive. Further, in each of the control periods, the first phase voltage is configured of a first voltage, among the voltages included in the third voltage group, whose absolute value is equal to or greater than the absolute value of the first phase voltage command and whose value is nearest to the value of the first phase voltage command, and a second voltage, among the voltages included in the third voltage group, whose absolute value is smaller than the absolute value of the first phase voltage command and whose value is nearest to the value of the first phase voltage command. Furthermore, in the power conversion device, in each of the control periods, the second phase voltage is configured of a third voltage, among the voltages included in the fourth voltage group, whose absolute value is equal to or greater than the absolute value of the second phase voltage command and whose value is nearest to the value of the second phase voltage command, and a fourth voltage, among the voltages included in the fourth voltage group, whose absolute value is smaller than the absolute value of the second phase voltage command and whose value is nearest to the value of the second phase voltage command. Further, in each of the control periods, the third phase voltage is configured of a fifth voltage, among the voltages included in the fifth voltage group, whose absolute value is equal to or greater than the absolute value of the third phase voltage command and whose value is nearest to the value of the third phase voltage command, and a sixth voltage, among the voltages included in the fifth voltage group, whose absolute value is smaller than the absolute value of the third phase voltage command and whose value is nearest to the value of the third phase voltage command. Further, in each of the control periods, the first inverter circuit outputs each of the first voltage and second voltage in a complementary way for a predetermined duration to the first alternating current output terminal, the second inverter circuit outputs each of the third voltage and fourth voltage in a complementary way for a predetermined duration to the second alternating current output terminal, and the third inverter circuit outputs each of the fifth voltage and sixth voltage in a complementary way for a predetermined duration to the third alternating current output terminal.

The output time of the first voltage is fixed based on the first phase voltage command, the first voltage, and the second voltage, while the output time of the second voltage is a time that is the output time of the first voltage subtracted from the time of the control period. Further, the output time of the third voltage is fixed based on the second phase voltage command, the third voltage, and the fourth voltage, while the output time of the fourth voltage is a time that is the output time of the third voltage subtracted from the time of the control period. Further, the output time of the fifth voltage is fixed based on the third phase voltage command, the fifth voltage, and the sixth voltage, while the output time of the sixth voltage is a time that is the output time of the fifth voltage subtracted from the time of the control period.

The output time of the first voltage is a time corresponding to a value obtained by dividing the voltage difference between the first phase voltage command and second voltage by the voltage difference between the first voltage and second voltage, while the output time of the second voltage is a time that is the output time of the first voltage subtracted from the time of the control period. Further, the output time of the third voltage is a time corresponding to a value obtained by dividing the voltage difference between the second phase voltage command and fourth voltage by the voltage difference between the third voltage and fourth voltage, while the output time of the fourth voltage is a time that is the output time of the third voltage subtracted from the time of the control period. Further, the output time of the fifth voltage is a time corresponding to a value obtained by dividing the voltage difference between the third phase voltage command and sixth voltage by the voltage difference between the fifth voltage and sixth voltage, while the output time of the sixth voltage is a time that is the output time of the fifth voltage subtracted from the time of the control period.

In each control period, the average value of the first phase voltage is equivalent to the average value of the first phase voltage command. Also, the average value of the second phase voltage is equivalent to the average value of the second phase voltage command. Also, the average value of the third phase voltage is equivalent to the average value of the third phase voltage command.

The V-connected power conversion device to which the invention is applied is such that, by the cycles of the line voltage commands being divided among a plurality of control periods, and a first voltage and second voltage selected in accordance with predetermined conditions from among four levels of voltage included in a predetermined voltage group each being output for a predetermined time in each control period, it is possible to generate a desired 3-phase alternating current voltage.

Also, the Y-connected power conversion device to which the invention is applied is such that, by the cycles of the phase voltage commands being divided among a plurality of control periods, and a first voltage and second voltage selected in accordance with predetermined conditions from among four levels of voltage included in a predetermined voltage group each being output for a predetermined time in each control period, it is possible to generate a desired 3-phase alternating current voltage.

Further, in either of the power conversion devices, it is sufficient that current passes through only one bidirectional switch element when voltage of the 3-phase alternating current power supply is output. Consequently, a power conversion device to which the invention is applied is such that it is possible to prevent an increase in conduction loss that occurs when voltage of the 3-phase alternating current power supply is output.

Also, in each control period, the switching elements and bidirectional switch elements operate between two levels of voltage selected from four levels of voltage included in each voltage group. At the very least, the difference between the two levels of voltage does not exceed the sizes of the positive voltage and negative voltage of the direct current power supply series circuit. Consequently, a power conversion device to which the invention is applied is such that it is possible to reduce switching loss that occurs in the switching elements and bidirectional switch elements.

Also, a power conversion device to which the invention is applied is such that, with no need to detect an interruption of the 3-phase alternating current power supply, it is possible to continue the supply of a 3-phase alternating current voltage to the load. Further, a power conversion device to which the invention is applied is such that there is no need for new disconnecting means for disconnecting the power conversion device from the 3-phase alternating current power supply when an interruption of the 3-phase alternating current power supply occurs.

BRIEF DESCRIPTION OF DRAWINGS

FIGS. 2A, 2B, 2C, and 2D are diagrams for illustrating an embodiment of a bidirectional switch element.

FIG. 4 is a diagram for illustrating a relationship of region determination to a pulse width command α and element selection.

FIG. 11 is a diagram for illustrating another relationship of region determination to the pulse width command α and element selection.

DESCRIPTION OF EMBODIMENTS

Hereafter, using FIGS. 1 to 17, a detailed description will be given of embodiments of a power conversion device according to the invention. The power conversion device shown in FIG. 1 to FIG. 17 is applied to a device, such as a momentary voltage drop compensation device or uninterruptible power supply device, for supplying a stable voltage to a load even when a 3-phase alternating current power supply voltage fluctuation or a 3-phase alternating current power supply interruption occurs.

Figure 1:
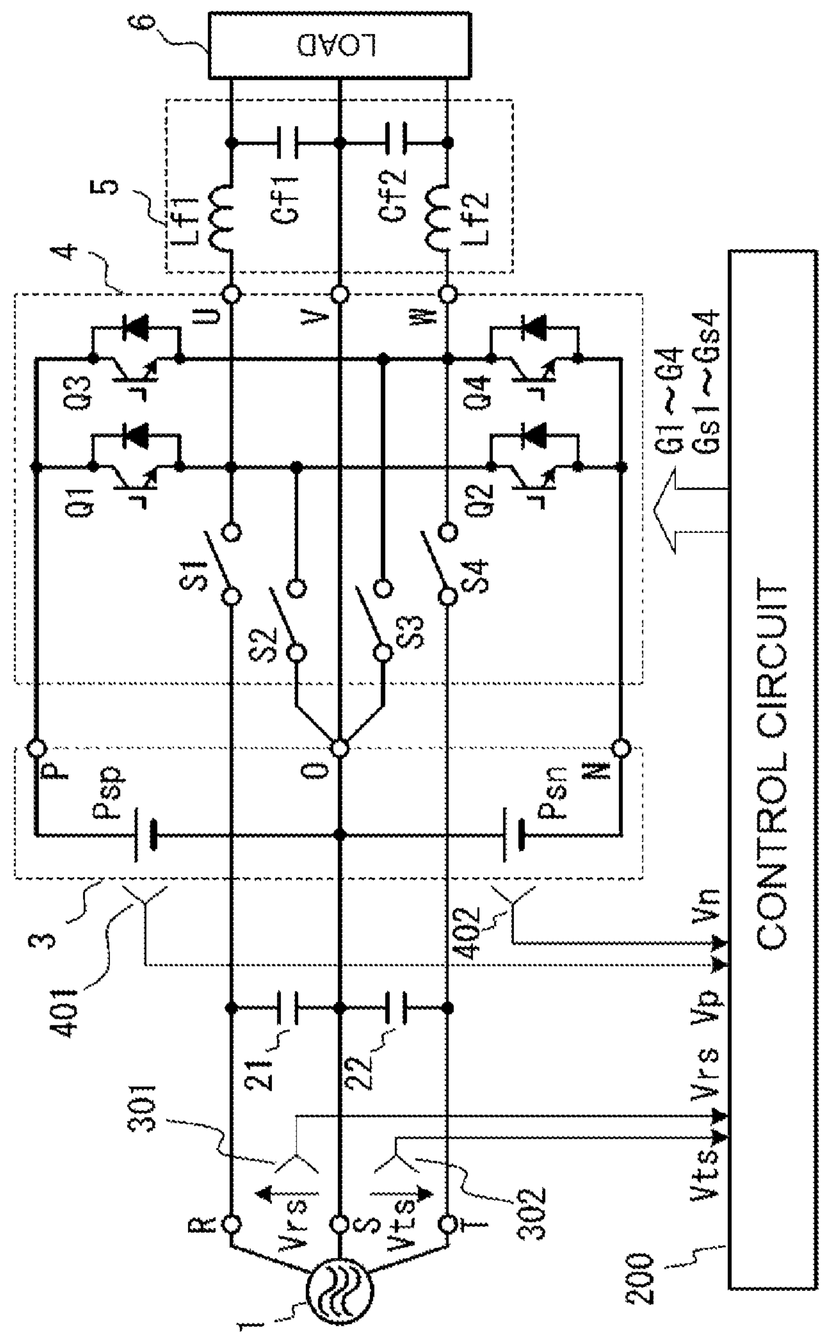
FIG. 1 is a diagram for illustrating a first embodiment of the invention.

FIG. 1 is a diagram for illustrating a first embodiment of the power conversion device according to the invention. The power conversion device is such that a 3-phase alternating current power supply 1 and a load 6 are V-connected, and a predetermined 3-phase alternating current voltage is generated using the voltage of the 3-phase alternating current power supply 1 and a direct current voltage generated from this voltage.

In the drawing, reference sign 1 is the 3-phase alternating current power supply, reference signs 21 and 22 are capacitors, reference sign 3 is a direct current power supply series circuit, reference sign 4 is an inverter circuit, reference sign 5 is a filter circuit, reference sign 6 is the load, and reference sign 200 is a control circuit.

The 3-phase alternating current power supply 1 outputs an R-phase voltage, an S-phase voltage, and a T-phase voltage from a terminal R (first terminal), a terminal S (third terminal), and a terminal T (second terminal) respectively. The capacitor 21 is connected between the terminal R and terminal S. The capacitor 22 is connected between the terminal T and terminal S.

The direct current power supply series circuit 3 is a direct current power supply circuit formed by a direct current power supply Psp and a direct current power supply Psn being connected in series. The direct current power supply Psp is a positive side direct current power supply. One end of the direct current power supply Psp is a positive side terminal P that outputs a voltage of positive polarity. The direct current power supply Psn is a negative side direct current power supply. One end of the direct current power supply Psn is a negative side terminal N that outputs a voltage of negative polarity. A series connection point of the direct current power supply Psp and direct current power supply Psn is a neutral terminal O that outputs a zero voltage. The neutral terminal O is connected to the terminal S of the 3-phase alternating current power supply 1.

The inverter circuit 4 has a first switching element series circuit, a second switching element series circuit, and bidirectional switch elements S1 to S4 as main components. The first switching element series circuit is a circuit formed by a switching element Q1 (first switching element), of which one end is connected to the positive side terminal P of the direct current power supply series circuit 3, and a switching element Q2 (second switching element), of which one end is connected to the negative side terminal N, being connected in series. The second switching element series circuit is a circuit formed by a switching element Q3 (third switching element), of which one end is connected to the positive side terminal P of the direct current power supply series circuit 3, and a switching element Q4 (fourth switching element), of which one end is connected to the negative side terminal N, being connected in series.

Herein, the switching elements Q1 to Q4 are configured of IGBTs (Insulated Gate Bipolar Transistors) wherein diodes are connected in anti-parallel. The switching elements Q1 to Q4 may be configured of other semiconductor elements in place of the IGBTs, provided that a turn on/turn off operation can be carried out at a frequency sufficiently higher than a commercial frequency.

A series connection point of the switching element Q1 and switching element Q2 is connected to an alternating current output terminal U (first alternating current output terminal) for outputting a U-phase voltage from the inverter circuit 4. A series connection point of the switching element Q3 and switching element Q4 is connected to an alternating current output terminal W (second alternating current output terminal) for outputting a W-phase voltage from the inverter circuit 4. Further, the neutral terminal O of the direct current power supply series circuit 3 is connected to an alternating current output terminal V (third alternating current output terminal) for outputting a V-phase voltage from the inverter circuit 4.

One end of the bidirectional switch element S1 (first bidirectional switch element) is connected to the alternating current output terminal U, while the other end is connected to the terminal R of the 3-phase alternating current power supply 1. One end of the bidirectional switch element S2 (second bidirectional switch element) is connected to the alternating current output terminal U, while the other end is connected to the neutral terminal O of the direct current power supply series circuit 3. One end of the bidirectional switch element S3 (third bidirectional switch element) is connected to the alternating current output terminal W, while the other end is connected to the neutral terminal O of the direct current power supply series circuit 3. One end of the bidirectional switch element S4 (fourth bidirectional switch element) is connected to the alternating current output terminal W, while the other end is connected to the terminal T of the 3-phase alternating current power supply 1.

Herein, configuration examples of the bidirectional switch elements S1 to S4 are shown in FIG. 2(a) to FIG. 2(d). The bidirectional switch element shown in FIG. 2(a) is configured by two reverse blocking IGBTs (Insulated Gate Bipolar Transistors) being connected in anti-parallel. The bidirectional switch element shown in FIG. 2(b) is configured by two circuits, wherein an IGBT having no reverse blocking breakdown voltage and a diode are connected in series, being connected in anti-parallel. The bidirectional switch element shown in FIG. 2(c) is configured by two switching elements, wherein a diode is connected in anti-parallel to an IGBT having no reverse blocking breakdown voltage, are connected in anti-series. The bidirectional switch element shown in FIG. 2(d) is of a configuration such that the IGBTs are replaced with MOSFETs (Metal Oxide Semiconductor Field Effect Transistors) in the bidirectional switch element shown in FIG. 2(c).

In the heretofore described configuration, the inverter circuit 4 outputs a first voltage and second voltage, selected from four levels of voltage included in a first voltage group, to the alternating current output terminal U in a complementary way in each of control periods to be described hereafter. The voltages included in the first voltage group are a zero voltage with the potential of the neutral terminal O as a reference, a positive voltage Vp of the direct current power supply Psp, a negative voltage Vn of the direct current power supply Psn, and a line voltage Vrs. The terminal S of the 3-phase alternating current power supply 1 is connected to the neutral terminal O. Consequently, the line voltage Vrs is the voltage between the terminals R and S of the 3-phase alternating current power supply 1.

Specifically, the inverter circuit 4 is such that the switching element Q1 is turned on when the positive voltage Vp is output to the alternating current output terminal U, and the switching element Q2 is turned on when the negative voltage Vn is output to the alternating current output terminal U. Also, the inverter circuit 4 is such that the bidirectional switch element S1 is turned on when the line voltage Vrs is output to the alternating current output terminal U, and the bidirectional switch element S2 is turned on when the zero voltage is output to the alternating current output terminal U.

Also, the inverter circuit 4 outputs a third voltage and fourth voltage, selected from four levels of voltage included in a second voltage group, to the alternating current output terminal W in a complementary way in each of the control periods. The voltages included in the second voltage group are the zero voltage with the potential of the neutral terminal O as a reference, the positive voltage Vp of the direct current power supply Psp, the negative voltage Vn of the direct current power supply Psn, and a line voltage Vts. The terminal S of the 3-phase alternating current power supply 1 is connected to the neutral terminal O. Consequently, the line voltage Vts is the voltage between the terminals T and S of the 3-phase alternating current power supply 1.

Specifically, the inverter circuit 4 is such that the switching element Q3 is turned on when the positive voltage Vp is output to the alternating current output terminal W, and the switching element Q4 is turned on when the negative voltage Vn is output to the alternating current output terminal W. Also, the inverter circuit 4 is such that the bidirectional switch element S4 is turned on when the line voltage Vts is output to the alternating current output terminal W, and the bidirectional switch element S3 is turned on when the zero voltage is output to the alternating current output terminal W.

As heretofore described, the neutral terminal O is connected to the alternating current output terminal V. Consequently, the voltage output to the alternating current output terminal U corresponds to the line voltage between the alternating current output terminals U and V. Also, the voltage output to the alternating current output terminal W corresponds to the line voltage between the alternating current output terminals W and V. Therefore, in the embodiment, the voltage output to the alternating current output terminal U is taken to be a line voltage Vuv (first line voltage). Also, the voltage output to the alternating current output terminal W is assumed to be a line voltage Vwv (second line voltage).

Also, the alternating current output terminal V is connected to the terminal S of the 3-phase alternating current power supply 1. Consequently, an S-phase voltage of the 3-phase alternating current power supply 1 is output to the alternating current output terminal V. The alternating current output terminals U, V, and W are connected via the filter circuit 5 to the load 6. The filter circuit 5 is comprised of a series circuit of a reactor Lf1 and capacitor Cf1 connected between the alternating current output terminals U and V and a series circuit of a reactor Lf2 and capacitor Cf2 connected between the alternating current output terminals W and V. The filter circuit 5 eliminates a ripple current component accompanying turn on/turn off operations of the switching elements and bidirectional switch elements from the 3-phase alternating current voltage output from the inverter circuit 4.

The control circuit 200 generates control signals G1 and G2 of the switching elements Q1 and Q2 and control signals Gs1 and Gs2 of the bidirectional switch elements S1 and S2 so that the line voltage Vuv coincides with a line voltage command Vuv* (first line voltage command). Also, the control circuit 200 generates control signals G3 and G4 of the switching elements Q3 and Q4 and control signals Gs3 and Gs4 of the bidirectional switch elements S3 and S4 so that the line voltage Vwv coincides with a line voltage command Vwv* (second line voltage command).

In order to do so, the control circuit 200 divides the cycles of the line voltage commands among a plurality of control periods, and carries out a logical operation for generating the control signals in each control period. The control periods have a predetermined duration and are consecutive periods. Hereafter, the length of the control periods is taken to be a switching cycle T.

It is desirable that a switching frequency fixed in accordance with the switching cycle T is a frequency that is sufficiently high with respect to the frequency of the line voltage command. For example, when the frequency of the line voltage command is a commercial frequency, it is preferable that the switching frequency is 1 kHz or higher. Also, it not being necessary that the switching cycle T is invariably synchronous with one cycle of the line voltage command, it may also be asynchronous.

Figure 3:
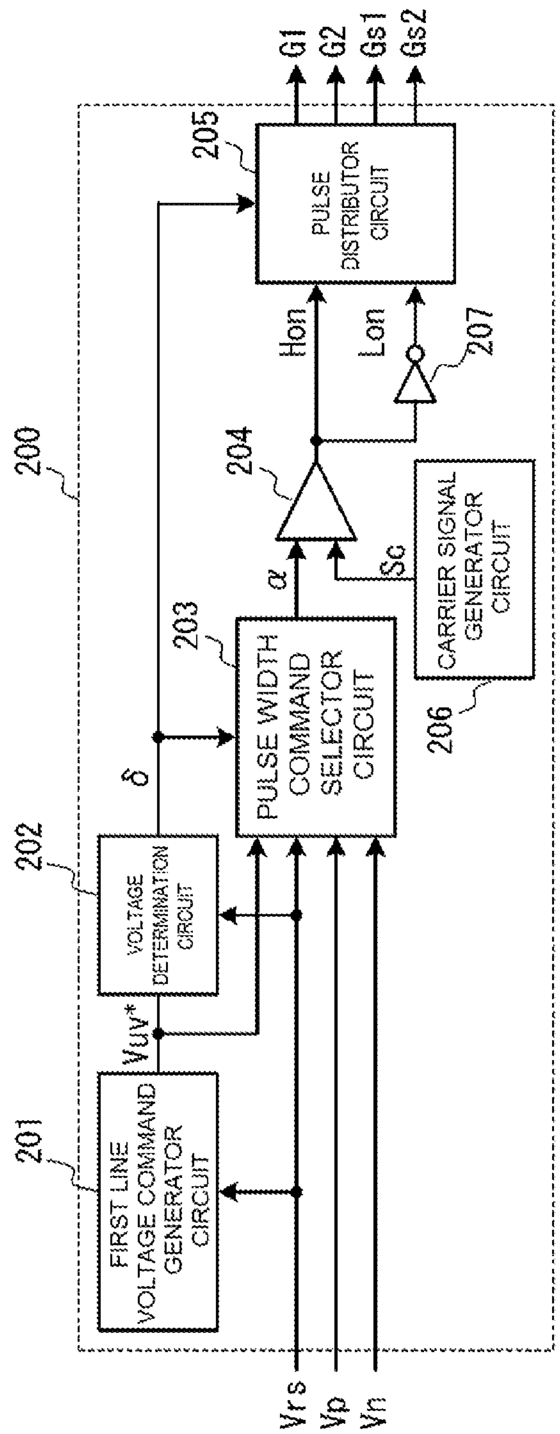
FIG. 3 is a block diagram for illustrating an operation of a control circuit.

FIG. 3 is a block diagram for illustrating, of the logical operations carried out by the control circuit 200, a logical operation for generating the control signals of the switching elements Q1 and Q2 and bidirectional switch elements S1 and S2. The logical operation for generating the control signals of the switching elements Q3 and Q4 and bidirectional switch elements S3 and S4 is also carried out in the same way.

The line voltage Vrs detected by a voltage detector 301, the voltage Vp detected by a voltage detector 401, and the voltage Vn detected by a voltage detector 402 are input into the control circuit 200. In accordance with the relationship between these three voltages, the control circuit 200 generates the control signals for the four elements—the switching elements Q1 and Q2 and the bidirectional switch elements S1 and S2—as described hereafter.

A first line voltage command generator circuit 201 generates the line voltage command Vuv* based on the line voltage Vrs. The line voltage command Vuv* is an alternating current voltage command for the line voltage Vuv output to the alternating current output terminal U by the inverter circuit 4. The line voltage command Vuv* is synchronous with the line voltage Vrs, and has an amplitude value equivalent to the rated voltage of the line voltage Vrs.

It is also possible to arrange that the line voltage command Vuv* is an alternating current voltage command asynchronous with the line voltage Vrs. It is also possible to arrange that the line voltage command Vuv* is an alternating current voltage command that has an amplitude value differing from the rated voltage of the line voltage Vrs.

The line voltage Vrs and line voltage command Vuv* are input into a voltage determination circuit 202. The voltage determination circuit 202, using the line voltage Vrs and line voltage command Vuv*, outputs a region signal δ to which the relevant switching cycle T belongs. Region signals δ are categorized into regions 1 to 6.

FIG. 4 is a diagram for illustrating a relationship of region determination carried out by the voltage determination circuit 202 to a pulse width command α and element selection. When the relationship between the line voltage command Vuv* and line voltage Vrs is such that Vuv*≥0 and Vrs<0, the voltage determination circuit 202 determines that the relevant switching cycle T is region 1.

When the relationship between the line voltage command Vuv* and line voltage Vrs is such that Vuv*≥0, Vrs≤0, and Vuv*>Vrs, the voltage determination circuit 202 determines that the relevant switching cycle T is region 2.

When the relationship between the line voltage command Vuv* and line voltage Vrs is such that Vuv*≥0, Vrs≥0, and Vuv*≤Vrs, the voltage determination circuit 202 determines that the relevant switching cycle T is region 3.

When the relationship between the line voltage command Vuv* and line voltage Vrs is such that Vuv*<0, Vrs<0, and Vuv*≥Vrs, the voltage determination circuit 202 determines that the relevant switching cycle T is region 4.

When the relationship between the line voltage command Vuv* and line voltage Vrs is such that Vuv*<0, Vrs<0, and Vuv*<Vrs, the voltage determination circuit 202 determines that the relevant switching cycle T is region 5.

When the relationship between the line voltage command Vuv* and line voltage Vrs is such that Vuv*<0 and Vrs≥0, the voltage determination circuit 202 determines that the relevant switching cycle T is region 6. In each region, one element of the four elements is selected as an H arm element, and another element is selected as an L arm element. The remaining two elements that are not selected as the H arm element or L arm element become off-state arm elements.

The H arm element is an element that, by being turned on, can output to the alternating current output terminal U the voltage (first voltage) of the four levels of voltage included in the first voltage group whose absolute value is equal to or greater than the absolute value of the line voltage command Vuv* and which is nearest to the line voltage command Vuv*. The H arm element is in an on-state for a time (H arm on-state time) in accordance with the pulse width command α, to be described hereafter.

The L arm element is an element that, by being turned on, can output to the alternating current output terminal U the voltage (second voltage) of the four levels of voltage included in the first voltage group whose absolute value is smaller than the absolute value of the line voltage command Vuv* and which is nearest to the line voltage command Vuv*. The L arm element is in an on-state for a time (L arm on-state time) that is the H arm on-state time subtracted from the switching cycle T.

The off-state arm elements are constantly in an off-state in the relevant switching cycle T. Returning to FIG. 3, the line voltage Vrs, voltage Vp, voltage Vn, line voltage command Vuv*, and region signal δ are input into a pulse width command selector circuit 203. The pulse width command selector circuit 203 that, based on these input signals, calculates the pulse width command α (the ratio of the on-state time with respect to the switching cycle T) for the H arm element.

The pulse width command α for regions 1 to 6 is calculated using the following expressions.

$$\text{Region 1 pulse width command } \alpha\alpha = Vuv^*/Vp \tag{1}$$

$$\text{Region 2 pulse width command } \alpha\alpha = (Vuv^* - Vrs)/(Vp - Vrs) \tag{2}$$

$$\text{Region 3 pulse width command } \alpha\alpha = Vuv^*/Vrs \tag{3}$$

$$\text{Region 4 pulse width command } \alpha\alpha = Vuv^*/Vrs \tag{4}$$

$$\text{Region 5 pulse width command } \alpha\alpha = (Vuv^* - Vrs)/(Vn - Vrs) \tag{5}$$

$$\text{Region 6 pulse width command } \alpha\alpha = Vuv^*/Vn \tag{6}$$

The pulse width command α and a carrier signal Sc generated in a carrier signal generator circuit 206 are input into a comparator 204. The comparator 204 compares the pulse width command α and carrier signal Sc, and generates a signal Hon for causing the H arm element to be turned on. When the H arm turn-on signal Hon is at a high level, the H arm element is in an on-state for the H arm on-state time within the switching cycle T.

A logic inverter 207 inverts the high level or low level of the H arm turn-on signal Hon to the low level or high level, and generates a signal Lon for causing the L arm element to be turned on. When the L arm turn-on signal Lon is at a high level, the L arm element is in an on-state for the L arm on-state time within the switching cycle T.

The H arm turn-on signal Hon, L arm turn-on signal Lon, and region signal δ are input into a pulse distributor circuit 205. The pulse distributor circuit 205 distributes the H arm turn-on signal Hon to the control signal of the H arm element selected in accordance with the region signal δ. Also, the pulse distributor circuit 205 distributes the L arm turn-on signal Lon to the control signal of the L arm element selected in accordance with the region signal δ. Further, the pulse distributor circuit 205 generates control signals for causing the off-state arm elements to be in an off-state for the relevant switching cycle T.

According to FIG. 4, at a region 1 time, the H arm element is the switching element Q1, the L arm element is the bidirectional switch element S2, and the off-state arm elements are the switching element Q2 and bidirectional switch element S1. At a region 2 time, the H arm element is the switching element Q1, the L arm element is the bidirectional switch element S1, and the off-state arm elements are the switching element Q2 and bidirectional switch element S2. At a region 3 time, the H arm element is the bidirectional switch element S1, the L arm element is the bidirectional switch element S2, and the off-state arm elements are the switching elements Q1 and Q2. At a region 4 time, the H arm element is the bidirectional switch element S1, the L arm element is the bidirectional switch element S2, and the off-state arm elements are the switching elements Q1 and Q2. At a region 5 time, the H arm element is the switching element Q2, the L arm element is the bidirectional switch element S1, and the off-state arm elements are the switching element Q1 and bidirectional switch element S2. At a region 6 time, the H arm element is the switching element Q2, the L arm element is the bidirectional switch element S2, and the off-state arm elements are the switching element Q1 and bidirectional switch element S1.

Next, a description will be given, referring to FIG. 5 to FIG. 7, of the relationship between the line voltage Vuv and the turn on/turn off operations of the four elements within the switching cycle T when the line voltage command Vuv* is equal to or greater than the zero voltage (regions 1 to 3).

Figure 5:
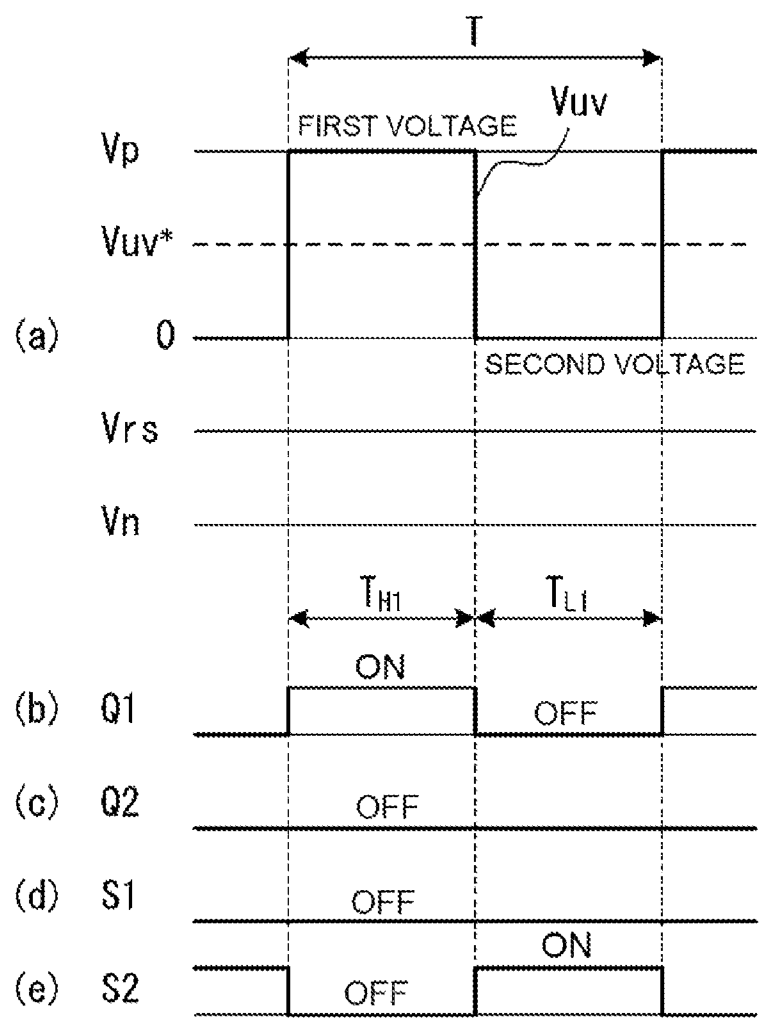
FIG. 5 is a diagram for illustrating alternating current output voltage in a region 1.
Figure 6:
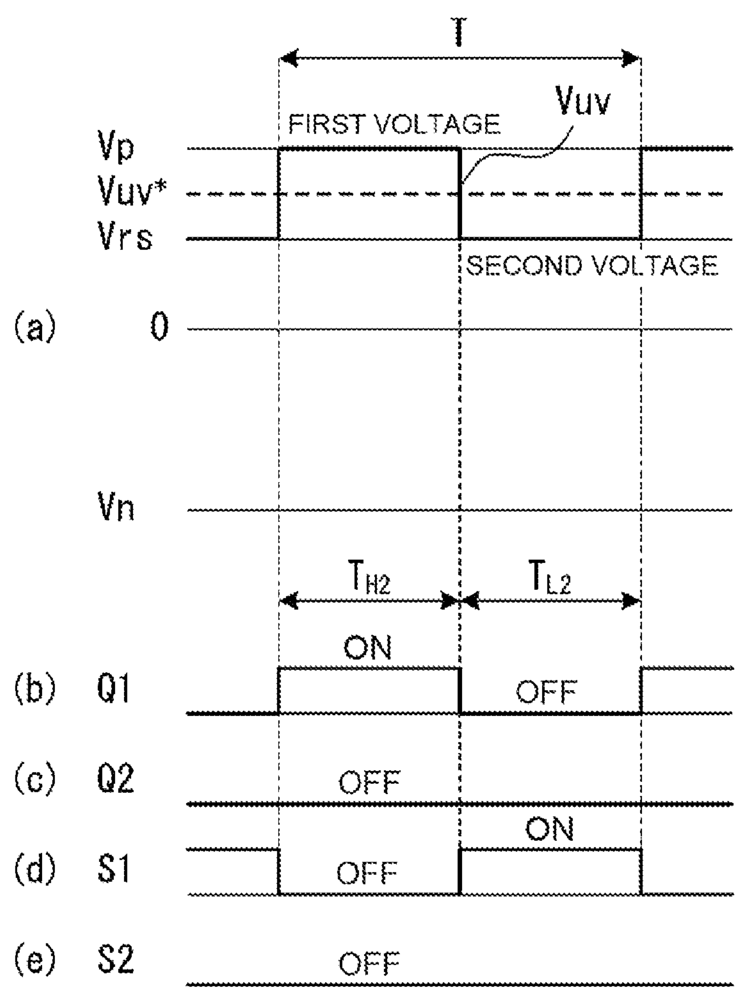
FIG. 6 is a diagram for illustrating alternating current output voltage in a region 2.

FIG. 5 (*a*) is a diagram for illustrating the line voltage Vuv output between the alternating current output terminals U and V in region 1. FIG. 5(*b*) to FIG. 5(*e*) are diagrams for illustrating operations of the switching elements Q1 and Q2 and bidirectional switch elements S1 and S2 in this region.

In this region, the H arm element is the switching element Q1. The L arm element is the bidirectional switch element S2. The off-state arm elements are the switching element Q2 and bidirectional switch element S1. Consequently, the switching element Q1 is in an on-state for an on-state time $T_{H1}$ (FIG. 5 (*b*)). Subsequently, the bidirectional switch element S2 is in an on-state for an on-state time $T_{L1}$ (FIG. 5(*e*)). The switching element Q2 and bidirectional switch element S1 are in an off-state (FIG. 5(*c*) and FIG. 5(*d*)).

The on-state time $T_{H1}$ is a time calculated with respect to the switching cycle T, based on the pulse width command $\alpha$ obtained using Expression (1). The on-state time $T_{H1}$ is a time that is the on-state time $T_{H1}$ subtracted from the switching cycle T.

Further, when the switching element Q1 is turned on, the voltage Vp of the direct current power supply Psp, which is the first voltage, is output between the alternating current output terminals U and V. When the bidirectional switch element S2 is turned on, the zero voltage, which is the second voltage, is output between the alternating current output terminals U and V (FIG. 5(*a*)). The average value of the line voltage Vuv output between the alternating current output terminals U and V is equivalent to the average value of the line voltage command Vuv*.

The voltages output within the switching cycle T may also be output in the order of the second voltage and the first voltage. This also applies in the following description. In FIG. 6, waveform (a) illustrates the line voltage Vuv output between the alternating current output terminals U and V in region 2. Waveforms (b) to (e) illustrate operation of the switching elements Q1 and Q2 and bidirectional switch elements S1 and S2 in this region.

In this region, the H arm element is the switching element Q1. The L arm element is the bidirectional switch element S1. The off-state arm elements are the switching element Q2 and bidirectional switch element S2. Consequently, the switching element Q1 is in an on-state for an on-state time $T_{H2}$ (FIG. 6, waveform (b)). Subsequently, the bidirectional switch element S1 is in an on-state for an on-state time $T_{H2}$ (FIG. 6, waveform (d)). The switching element Q2 and bidirectional switch element S2 are in an off-state (FIG. 6, waveforms (c) and (e)).

The on-state time $T_{H2}$ is a time calculated with respect to the switching cycle T, based on the pulse width command $\alpha$ obtained using Expression (2). The on-state time $T_{H2}$ is a time that is the on-state time $T_{H2}$ subtracted from the switching cycle T.

Further, when the switching element Q1 is turned on, the voltage Vp of the direct current power supply Psp, which is the first voltage, is output between the alternating current output terminals U and V. When the bidirectional switch element S1 is turned on, the line voltage Vrs of the 3-phase alternating current power supply 1, which is the second voltage, is output between the alternating current output terminals U and V (FIG. 6(*a*)). The average value of the line voltage Vuv output between the alternating current output terminals U and V is equivalent to the average value of the line voltage command Vuv*.

Figure 7:
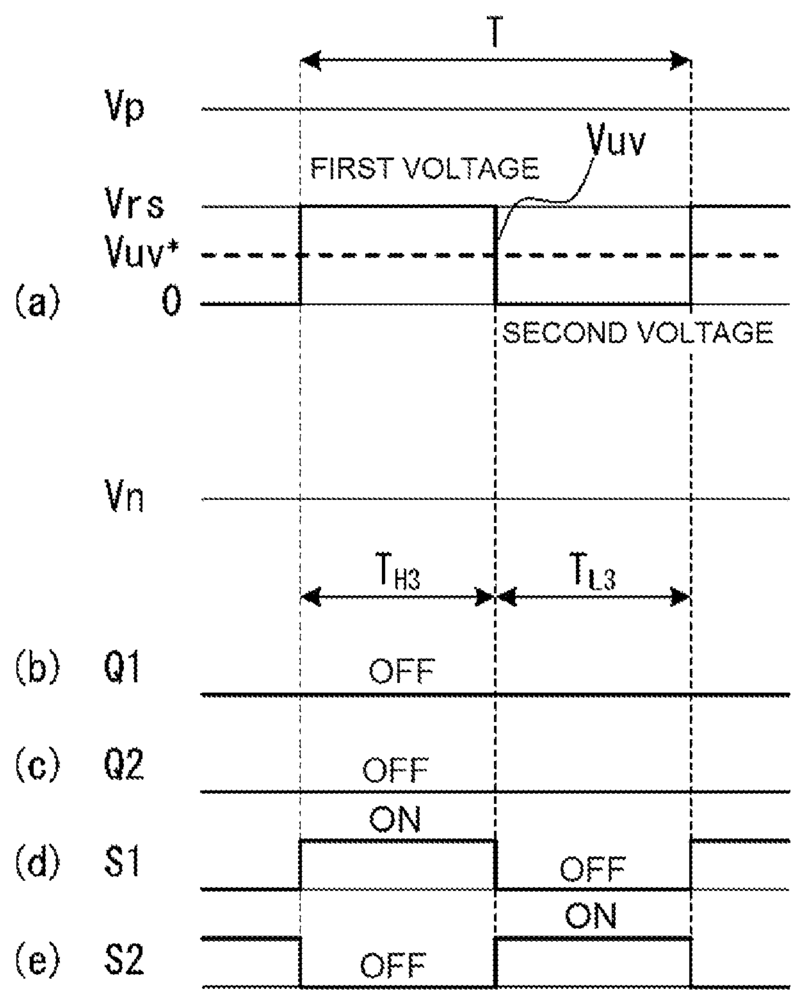
FIG. 7 is a diagram for illustrating alternating current output voltage in a region 3.

In FIG. 7, waveform (a) illustrates the line voltage Vuv output between the alternating current output terminals U and V in region 3. Waveforms (b) to (e) illustrate operation of the switching elements Q1 and Q2 and bidirectional switch elements S1 and S2 in this region.

In this region, the H arm element is the bidirectional switch element S1. The L arm element is the bidirectional switch element S2. The off-state arm elements are the switching element Q1 and switching element Q2. Consequently, the bidirectional switch element S1 is in an on-state for an on-state time $T_{H3}$ (FIG. 7, waveform (b)). Subsequently, the bidirectional switch element S2 is in an on-state for an on-state time $T_{L3}$ (FIG. 7, waveform (d)). The switching element Q1 and switching element Q2 are in an off-state (FIG. 7, waveforms (c) and (e)).

The on-state time $T_{H3}$ is a time calculated with respect to the switching cycle T, based on the pulse width command $\alpha$ obtained using Expression (3). The on-state time $T_{L3}$ is a time that is the on-state time $T_{H3}$ subtracted from the switching cycle T.

Further, when the bidirectional switch element S1 is turned on, the line voltage Vrs of the 3-phase alternating current power supply 1, which is the first voltage, is output between the alternating current output terminals U and V. When the bidirectional switch element S2 is turned on, the zero voltage, which is the second voltage, is output between the alternating current output terminals U and V (FIG. 7, waveform (a)). The average value of the line voltage Vuv output between the alternating current output terminals U and V is equivalent to the average value of the line voltage command Vuv*.

Figure 8:
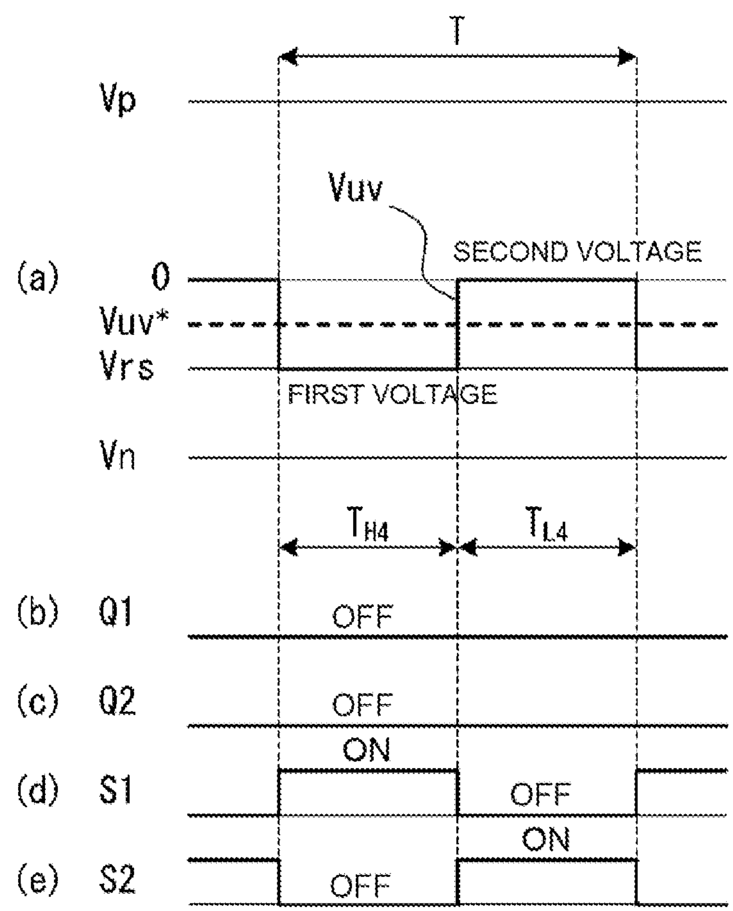
FIG. 8 is a diagram for illustrating alternating current output voltage in a region 4.
Figure 9:
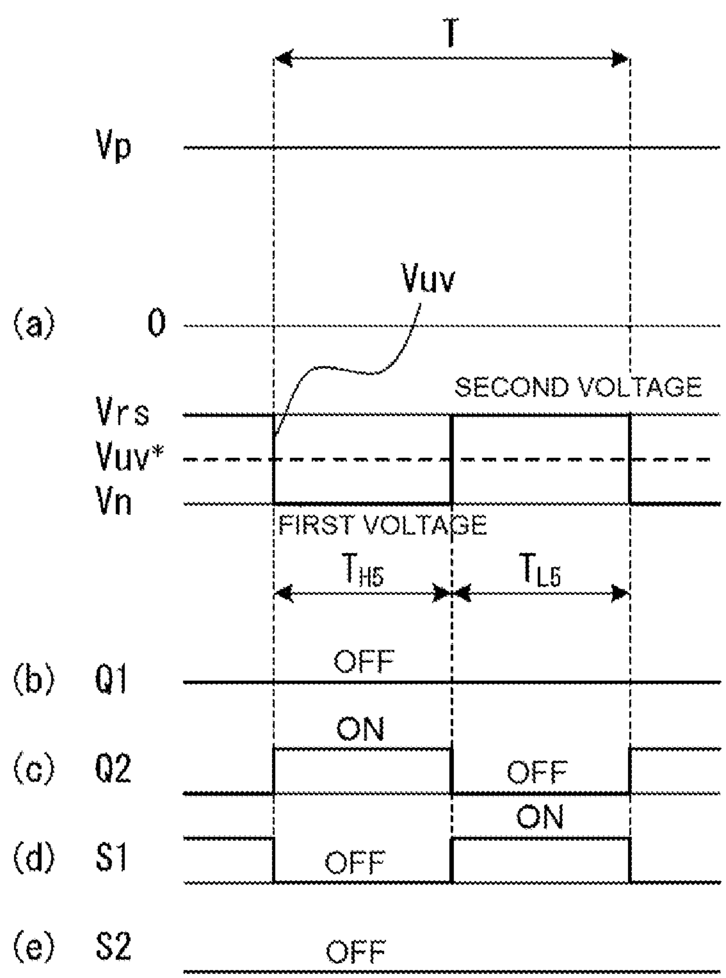
FIG. 9 is a diagram for illustrating alternating current output voltage in a region 5.
Figure 10:
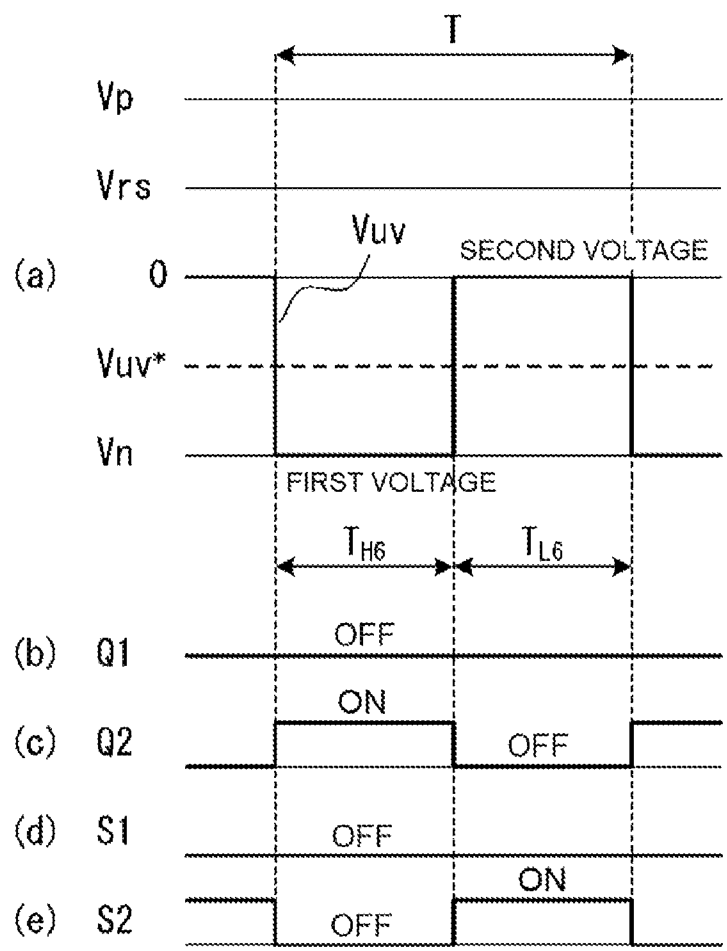
FIG. 10 is a diagram for illustrating alternating current output voltage in a region 6.

FIG. 8 to FIG. 10 are diagrams illustrating the relationship between the line voltage Vuv and the turn on/turn off operations of the four elements within the switching cycle T when the line voltage command Vuv* is smaller than the zero voltage (regions 4 to 6).

FIG. 8 is a diagram illustrating alternating current output voltages in region 4. Region 4 is a region in which, owing to the symmetry of circuit operations, the switching elements Q1 and Q2 and bidirectional switch elements S1 and S2 carry out practically the same operations as in the case of region 3. In this region, line voltage Vuv of which the average voltage is equivalent to the average voltage of the line voltage command Vuv* is output between the alternating current output terminals U and V.

FIG. 9 is a diagram illustrating alternating current output voltages in region 5. Region 5 is a region in which, owing to the symmetry of circuit operations, the operations of the switching element Q1 and switching element Q2 are reversed, and carry out practically the same operations as in the case of region 2. In this region line voltage Vuv of which the average voltage is equivalent to the average voltage of the line voltage command Vuv* is output between the alternating current output terminals U and V.

FIG. 10 is a diagram illustrating alternating current output voltages in region 6. Region 6 is a region in which, owing to the symmetry of circuit operations, the operations of the switching element Q1 and switching element Q2 are reversed, and carry out practically the same operations as in the case of region 1. In this region, line voltage Vuv of which the average voltage is equivalent to the line voltage command Vuv* is output between the alternating current output terminals U and V.

As heretofore described, the control circuit 200 selects an H arm element and L arm element for each switching cycle T. Further, the inverter circuit 4 causes the H arm element and L arm element to be turned on for respective predetermined times within the switching cycle T, and generates line voltage Vuv of which the average voltage is equivalent to the average voltage of the line voltage command Vuv* between the alternating current output terminals U and V.

For example, when the line voltage Vrs of the 3-phase alternating current power supply 1 is smaller than the line voltage command Vuv*, the inverter circuit 4 can superimpose the positive voltage Vp and negative voltage Vn of the direct current power supply series circuit 3 on the line voltage Vrs of the 3-phase alternating current power supply 1 as appropriate, thus generating the line voltage Vuv (region 2 and region 5).

Also, when the line voltage Vrs of the 3-phase alternating current power supply 1 is greater than the line voltage command Vuv*, the inverter circuit 4 can reduce the voltage of the 3-phase alternating current power supply 1, thus generating the line voltage Vuv (region 3 and region 4).

Furthermore, the inverter circuit 4 can also generate line voltage Vuv of a polarity the opposite of that of the line voltage Vrs of the 3-phase alternating current power supply 1 (region 1 and region 6). The line voltage Vuv generated at this time is a voltage whose phase deviates considerably from that of the line voltage Vrs of the 3-phase alternating current power supply 1.

However, the inverter circuit 4 cannot output a voltage higher than the voltage Vp of the direct current power supply Psp, and cannot output a voltage lower than the voltage Vn of the direct current power supply Psn. Consequently, when the line voltage command Vuv* is greater than the voltage Vp, and when the line voltage command Vuv* is smaller than the voltage Vn, it is appropriate that a protective operation, such as turning off all the elements, is carried out.

Also, when the line voltage command Vuv* is greater than the voltage Vp, the switching element Q1 may be constantly maintained in an on-state. Further, when the line voltage command Vuv* is smaller than the voltage Vn, the switching element Q2 may be constantly maintained in an on-state.

As is clear from the above description, the circuit for outputting the line voltage Vuv between the alternating current output terminals U and V and the circuit for outputting the line voltage Vwv between the alternating current output terminals W and V in the inverter circuit 4 are configured symmetrically across a line connecting the terminal S of the 3-phase alternating current power supply 1 and the alternating current output terminal V. Consequently, a logical operation for generating the control signals of the switching elements Q3 and Q4 and bidirectional switch elements S3 and S4 in the control circuit 200 is carried out in the same way as the logical operation for generating the control signals of the switching elements Q1 and Q2 and bidirectional switch elements S1 and S2 described using FIG. 3. That is, the control circuit 200 categorizes each control period into regions 1 to 6 using the line voltage Vts of the 3-phase alternating current power supply 1 and the line voltage command Vwv*. Further, the control circuit 200, using the voltages Vp, Vn, and Vts and the line voltage command Vwv*, sets an H arm element and L arm element, calculates the on-state times of these elements, and generates the control signals of the switching elements Q3 and Q4 and bidirectional switch elements S3 and S4.

Also, the relationship between the operations of the switching elements Q3 and Q4 and bidirectional switch elements S3 and S4 and the line voltage Vwv output between the alternating current output terminals W and V is the same as the relationship between the operations of the switching elements Q1 and Q2 and bidirectional switch elements S1 and S2 and the line voltage Vuv output between the alternating current output terminals U and V, described using FIG. 4 to FIG. 10. That is, the inverter circuit 4 causes the switching elements Q3 and Q4 and bidirectional switch elements S3 and S4 to carry out turn on/turn off operations in accordance with the control signals generated in each control period. As a result of this, the inverter circuit 4 outputs line voltage Vwv that has an average value equivalent to the average value of the line voltage command Vwv* between the alternating current output terminals W and V.

As heretofore described, the power conversion device according to the first embodiment is such that by the first voltage and second voltage being appropriately selected in each control period, and the output time of each voltage being appropriately set, line voltage Vuv that has an average voltage equivalent to the average voltage of the line voltage command Vuv* can be output. Also, the power conversion device according to the first embodiment is such that by the third voltage and fourth voltage being appropriately selected in each control period, and the output time of each voltage being appropriately set, line voltage Vwv that has an average voltage equivalent to the average voltage of the line voltage command Vwv* can be output.

At this time, the switching elements Q1 and Q2 and bidirectional switch elements S1 and S2 carry out turn on/turn off operations between the first voltage and second voltage. Also, the switching elements Q3 and Q4 and bidirectional switch elements S3 and S4 carry out turn on/turn off operations between the third voltage and fourth voltage. As is clear from FIG. 5 to FIG. 10, the voltage difference between the first voltage and second voltage does not exceed the sizes of the voltages Vp and Vn of the direct current power supply. In the same way, the voltage difference between the third voltage and fourth voltage does not exceed the sizes of the voltages Vp and Vn of the direct current power supply.

Figure 18:
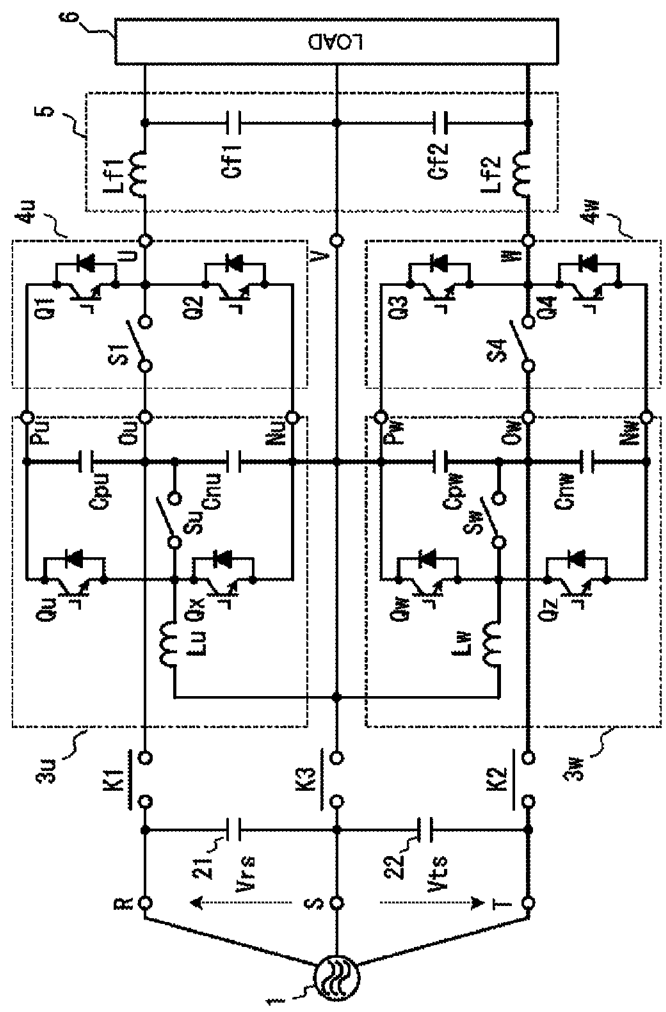
FIG. 18 is a diagram for illustrating a power conversion device according to heretofore known technology.

Meanwhile, a power conversion device shown in FIG. 18 is such that switching elements of an inverter circuit carry out turn on/turn off operations at a positive voltage and negative voltage of a direct current power supply. Consequently, under the same switching frequency conditions, switching loss occurring when the switching elements of the inverter circuit 4 according to the embodiment are turned on and turned off is small compared with the switching loss of the switching element in the power conversion device shown in FIG. 18. In the same way, switching loss occurring when the bidirectional switch elements according to the embodiment are turned on and turned off is small compared with the switching loss of the switching element in the power conversion device shown in FIG. 18. That is, the power conversion device according to the embodiment is such that switching loss can be reduced further than in the power conversion device shown in FIG. 18.

In particular, it is preferable that the line voltage command Vuv* is synchronized with the line voltage Vrs of the 3-phase alternating current power supply 1, and the line voltage command Vwv* synchronized with the line voltage Vts of the 3-phase alternating current power supply 1. Provided that the line voltage commands are synchronized with the line voltages of the 3-phase alternating current power supply 1, the voltage applied to the switching elements Q1 to Q4 and bidirectional switch elements S1 to S4 can be reduced. As a result of this, the switching loss occurring in these elements can be further reduced.

Also, the line voltage Vuv of the power conversion device according to the embodiment changes between the first voltage and second voltage. Consequently, the voltage applied to the reactor Lf1 decreases. The ripple current flowing through the reactor Lf1 is proportional to the voltage-time product (voltage change range×voltage pulse width), and inversely proportional to the inductance value. When the inductance value is the same, the power conversion device according to the embodiment is such that, as the voltage-time product decreases, the ripple current flowing through the reactor Lf1 decreases. When the ripple current decreases, loss (mainly iron loss) in the reactor Lf1 decreases. Consequently, it is possible to reduce loss in the reactor Lf1.

Meanwhile, when the ripple current is the same, it is possible to reduce the inductance value of the reactor Lf1. In this case, it is possible to reduce the size of the reactor Lf1. In the same way, it is possible to reduce loss in, or the size of, the reactor Lf2.

Also, the power conversion device according to the embodiment is such that, even when an interruption of the 3-phase alternating current power supply 1 occurs, an H arm element and L arm element can be selected for each switching cycle T using a logical operation identical to that when the 3-phase alternating current power supply 1 is normal. Further, in the same way as when the 3-phase alternating current power supply 1 is normal, line voltage Vuv in accordance with the line voltage command Vuv* and line voltage Vwv in accordance with the line voltage command Vwv* can be output by the selected H arm element and L arm element being turned on and off.

Figure 12:
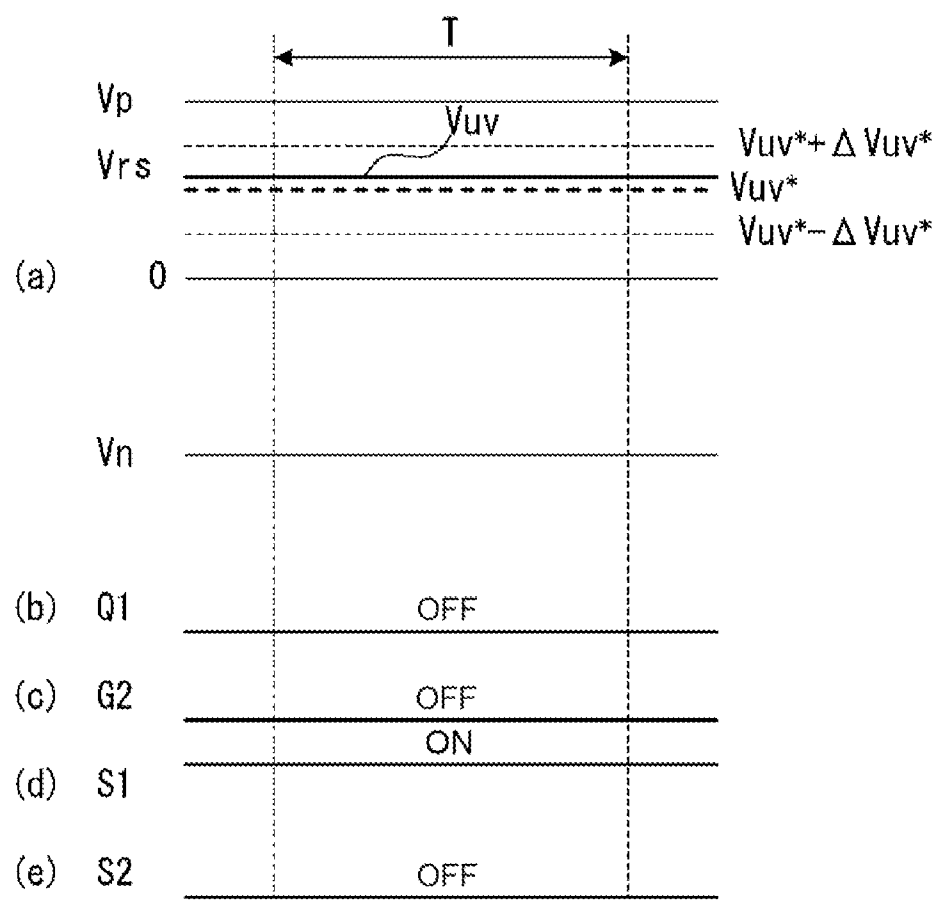
FIG. 12 is a diagram for illustrating alternating current output voltage in a region 7.

Consequently, the power conversion device according to the embodiment is such that means for detecting an interruption of the 3-phase alternating current power supply 1 is not necessary in the control of outputting the line voltage Vuv and line voltage Vwv. Next, FIG. 11 is a diagram illustrating another relationship of a region determination carried out by the control circuit 200 to the pulse width command α and element selection. Also, FIG. 12 is a diagram illustrating the line voltage Vuv and operations of the switching elements Q1 and Q2 and bidirectional switch elements S1 and S2 in a region 7.

The configuration of the control circuit 200 is the same as that of the control circuit shown in FIG. 3. However, the voltage determination circuit 202 further determines region 7 in addition to regions 1 to 6 shown in FIG. 4. Region 7 is a region for outputting the line voltage Vrs of the 3-phase alternating current power supply 1 between the alternating current output terminals U and V. Region 7 is determined in priority to regions 1 to 6.

Hereafter, referring to FIG. 3, FIG. 11, and FIG. 12, a description will be given of an operation of the control circuit 200 relating mainly to region 7. A description of portions common to regions 1 to 6 described above will be omitted as appropriate.

The line voltage command Vuv* and the line voltage Vrs of the 3-phase alternating current power supply 1 are input into the voltage determination circuit 202 for each switching cycle T. When the relationship between the two voltages satisfies the condition of |Vuv*−Vrs|<ΔVuv*, the voltage determination circuit 202 determines that the relevant switching cycle T is region 7. At this time, the voltage determination circuit 202 outputs a region signal δ indicating region 7.

ΔVuv* is a reference amount for determining that the value of the line voltage Vrs of the 3-phase alternating current power supply 1 is within a predetermined range with respect to the value of the line voltage command Vuv*. When the load 6 tolerates a fluctuation in input voltage within a range of the line voltage command Vuv*±10%, the reference amount ΔVuv* is an amount corresponding to 10% of the line voltage command Vuv*. The reference amount ΔVuv* may also be an amount fixed by another condition.

The pulse width command selector circuit 203 fixes the pulse width command α at 1.0 when the region signal δ indicating region 7 is input. When the pulse width command α is 1.0, the comparator 204 generates the signal Hon causing the H arm element to be turned on throughout the switching cycle T, regardless of the size of the carrier signal Sc. That is, in the relevant switching cycle T, the H arm turn-on signal Hon is constantly at a high level, and the L arm turn-on signal Lon is constantly at a low level.

The pulse distributor circuit 205 sets the bidirectional switch element S1 as the H arm element when the region signal δ indicating region 7 is input. Also, the pulse distributor circuit 205 sets the switching elements Q1 and Q2 and the bidirectional switch element S2 as the off-state arm elements. Consequently, the pulse distributor circuit 205 outputs a control signal Gs1 of the bidirectional switch element S1 that is at a high level during the relevant switching cycle T, and control signals G1, G2, and Gs2 of the switching elements Q1 and Q2 and the bidirectional switch element S2 that are at a low level during the relevant switching cycle T.

Consequently, in the switching cycle T determined to be region 7, the bidirectional switch element S1 is in an on-state, and the switching elements Q1 and Q2 and the bidirectional switch element S2 are in an off-state. As only the bidirectional switch element S1 is in an on-state, the line voltage Vrs of the 3-phase alternating current power supply 1 is output between the alternating current output terminals U and V.

In the case of region 7, the control circuit 200 carries out the same logical operation when the line voltage command Vuv* is of negative polarity as when the line voltage command Vuv* is of positive polarity, generating the control signals of the switching elements Q1 and Q2 and bidirectional switch elements S1 and S2.

Also, as is clear from the configuration of the inverter circuit 4, the circuit for outputting the line voltage Vuv between the alternating current output terminals U and V and the circuit for outputting the line voltage Vwv between the alternating current output terminals W and V are configured symmetrically across a line connecting the terminal S of the 3-phase alternating current power supply 1 and the alternating current output terminal V. Consequently, the control circuit 200 carries out a logical operation the same as that described using FIG. 3, generating the control signals of the switching elements Q3 and Q4 and bidirectional switch elements S3 and S4.

As a result of this, in the switching cycle T determined to be region 7, the bidirectional switch elements S1 and S4 are in an on-state, and the switching elements Q1 to Q4 and bidirectional switch elements S2 and S3 are in an off-state. Therefore, conduction loss due to current energization occurs in the bidirectional switch elements S1 and S4. As no current is caused to flow through the switching elements Q1 to Q4 and bidirectional switch elements S2 and S3, no conduction loss occurs. Also, as not all the elements carry out a turn on/turn off operation, no switching loss occurs.

Consequently, when providing region 7 in the operation of the inverter circuit 4, it is possible to further reduce power loss. Also, in region 7, no ripple current due to turn on/turn off operations of the switching elements and bidirectional switch elements flows through the reactors Lf1 and Lf2. Consequently, it is possible to reduce loss in the reactors Lf1 and Lf2.

Figure 13:
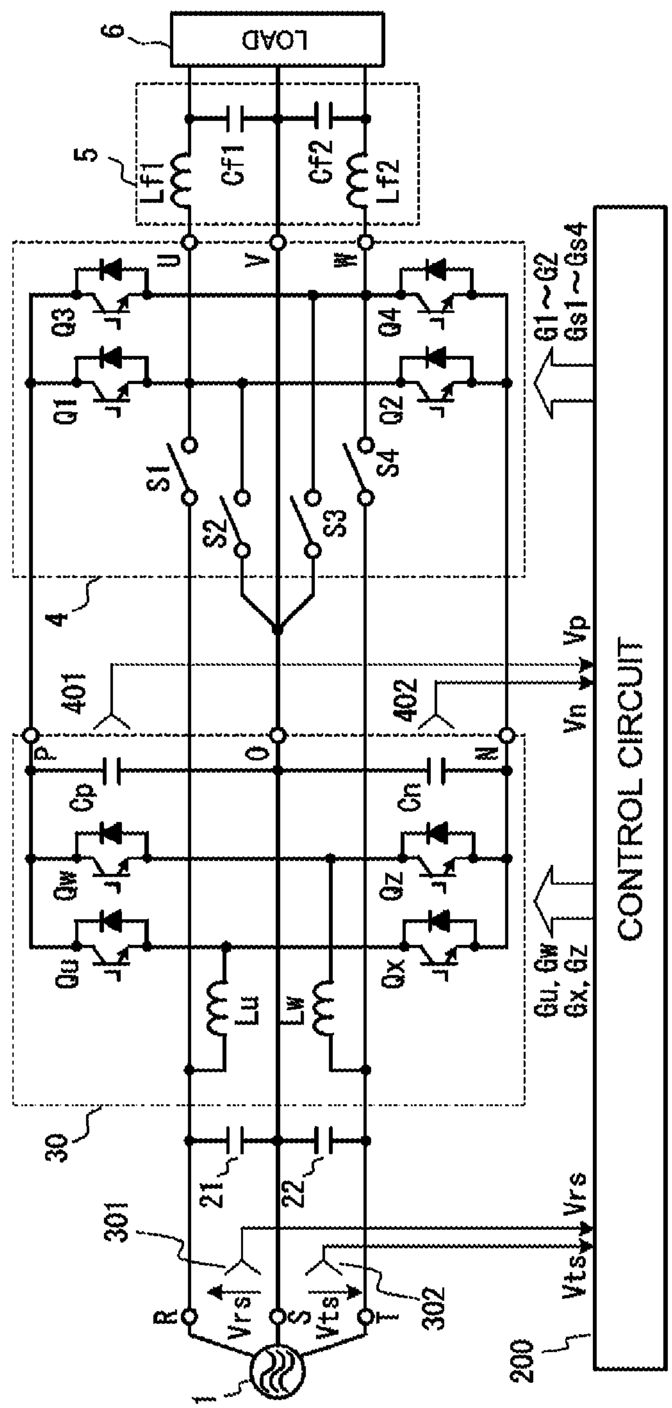
FIG. 13 is a diagram for illustrating a second embodiment of the invention.

Next, FIG. 13 is a diagram for describing a second embodiment of the power conversion device according to the invention. The power conversion device according to this embodiment is such that the direct current power supply series circuit 3 of the embodiment shown in FIG. 1 comprises a converter circuit 30.

The converter circuit 30 has as main components a series circuit of a capacitor Cp and capacitor Cn, a series circuit of a switching element Qu and switching element Qx, a series circuit of a switching element Qw and switching element Qz, a reactor Lu, and a reactor Lw. A connection point of the capacitor Cp and capacitor Cn is connected to the terminal S of the 3-phase alternating current power supply 1, and is connected to the neutral terminal O of the converter circuit 30. The series circuit of the switching element Qu and switching element Qx and the series circuit of the switching element Qw and switching element Qz are connected in parallel with the series circuit of the capacitor Cp and capacitor Cn. The reactor Lu is connected between a connection point of the switching element Qu and switching element Qx and the terminal R of the 3-phase alternating current power supply 1. The reactor Lw is connected between a connection point of the switching element Qw and switching element Qz and the terminal T of the 3-phase alternating current power supply 1.

The heretofore described configuration is such that, when the line voltage Vrs of the 3-phase alternating current power supply 1 is of positive polarity, firstly, the switching element Qx is turned on, and the switching element Qu is turned off. By the switching element Qx being turned on, a voltage that is the voltage Vn of the capacitor Cn added to the line voltage Vrs is applied to the reactor Lu, and energy is accumulated in the reactor Lu. Next, the switching element Qx is turned off, and the switching element Qu is turned on. When the switching element Qx is turned off, the capacitor Cp is charged by the energy accumulated in the reactor Lu.

Meanwhile, when the line voltage Vrs of the 3-phase alternating current power supply 1 is of negative polarity, firstly, the switching element Qu is turned on, and the switching element Qx is turned off. By the switching element Qu being turned on, a voltage that is the voltage Vp of the capacitor Cp added to the line voltage Vrs is applied to the reactor Lu, and energy is accumulated in the reactor Lu. Next, the switching element Qu is turned off, and the switching element Qx is turned on. When the switching element Qu is turned off, the capacitor Cn is charged by the energy accumulated in the reactor Lu.

By causing the switching elements Qu and Qx to carry out turn on/turn off operations in this way, it is possible to maintain the voltage of the capacitors Cp and Cn at a predetermined voltage value higher than the amplitude value of the line voltage Vrs. By causing the switching elements Qw and Qz to carry out turn on/turn off operations in the same way, it is possible, using the line voltage Vts, to maintain the voltage of the capacitors Cp and Cn at a predetermined voltage value higher than the amplitude value of the line voltage Vts. The switching elements Qu and Qx, and Qw and Qz, carry out the turn on/turn off operations at a frequency sufficiently higher than the frequency of the 3-phase alternating current power supply 1.

The capacitors Cp and Cn charged to the predetermined voltage function as a serially connected direct current power supply for the inverter circuit 4. That is, the capacitor Cp corresponds to the positive side direct current power supply Psp of the direct current power supply series circuit 3. Also, the capacitor Cn corresponds to the negative side direct current power supply Psn of the direct current power supply series circuit 3.

The heretofore described configuration is such that the inverter circuit 4 according to the embodiment carries out the region 1 to region 6 operations described using FIG. 3 to FIG. 10, in the same way as the inverter circuit 4 according to the first embodiment. Because of these operations, the advantages produced by the power conversion device according to the embodiment are the same as those produced by the power conversion device according to the first embodiment.

That is, the power conversion device according to the embodiment is such that line voltage Vuv in accordance with the line voltage command Vuv* can be output to the alternating current output terminal U. Also, the power conversion device is such that line voltage Vwv in accordance with the line voltage command Vwv* can be output to the alternating current output terminal W.

Further, when outputting the line voltages, the power conversion device according to the embodiment is such that switching loss can be reduced further than in the case of the power conversion device shown in FIG. 18. Also, the power conversion device according to the embodiment is such that, because of the heretofore described actions, it is possible to reduce loss in, or the size of, the reactors Lf1 and Lf2. Also, the power conversion device according to the embodiment is such that, because of the heretofore described actions, means for detecting an interruption of the 3-phase alternating current power supply 1 is not necessary in the control of outputting the line voltage Vuv and line voltage Vwv.

Also, the inverter circuit 4 according to the embodiment carries out the region 7 operation described using FIG. 11 and FIG. 12, in the same way as the inverter circuit 4 according to the first embodiment. Because of this operation, the power conversion device according to the embodiment is such that it is possible to further reduce power loss. Also, the power conversion device according to the embodiment is such that it is possible to further reduce loss in the reactors Lf1 and Lf2 in region 7.

Figure 14:
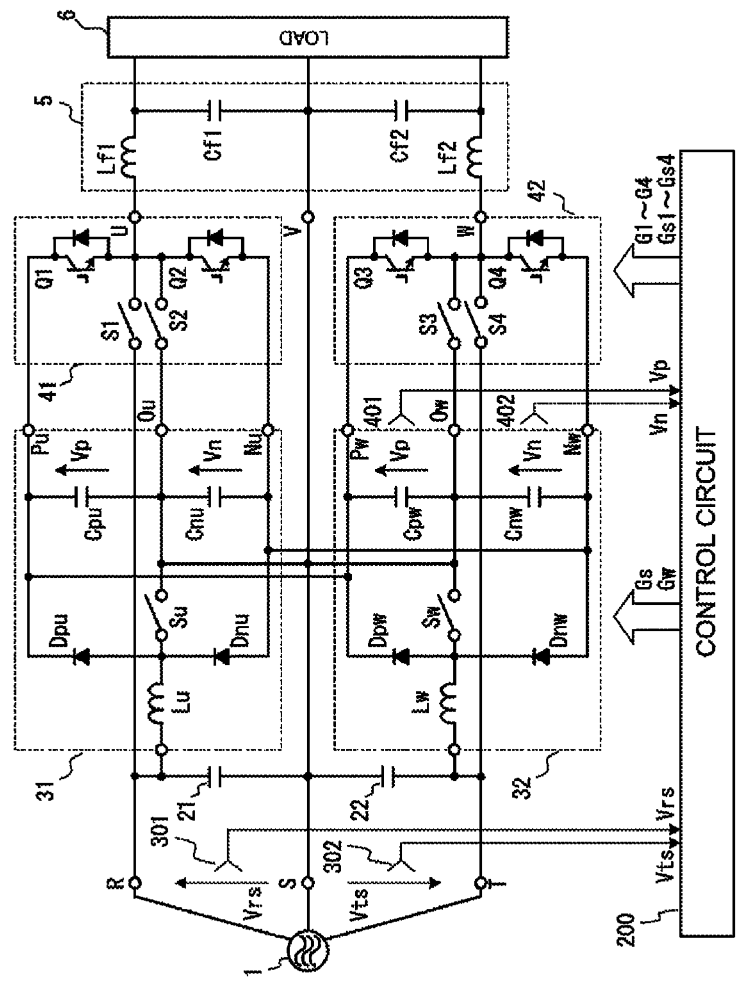
FIG. 14 is a diagram for illustrating a third embodiment of the invention.

Next, FIG. 14 is a diagram for describing a third embodiment of the power conversion device according to the invention. The power conversion device according to this embodiment is such that the inverter circuit 4 of the power conversion device shown in FIG. 1 is configured of an inverter circuit 41 and inverter circuit 42. The inverter circuit 41 is an inverter circuit that outputs the line voltage Vuv to the alternating current output terminal U (first alternating current output terminal). The inverter circuit 42 is an inverter circuit that outputs the line voltage Vwv to the alternating current output terminal W (second alternating current output terminal). Furthermore, the power conversion device according to this embodiment is such that the direct current power supply series circuit 3 is configured of a converter circuit 31 corresponding to the inverter circuit 41 and a converter circuit 32 corresponding to the inverter circuit 42.

The converter circuit 31 has as main components a series circuit of a diode Dpu and diode Dnu, a series circuit of a capacitor Cpu and capacitor Cnu, a bidirectional switch element Su, and the reactor Lu. A positive side terminal of the capacitor Cpu is connected to a positive side output terminal Pu of the converter circuit 31. A negative side terminal of the capacitor Cnu is connected to a negative side output terminal Nu of the converter circuit 31. Also, a connection point of the capacitors Cpu and Cnu is connected to a neutral terminal Ou of the converter circuit 31. The series circuit of the diodes Dpu and Dnu is connected in parallel with the series circuit of the capacitors Cpu and Cnu. The bidirectional switch element Su is connected between a connection point of the diodes Dpu and Dnu and a connection point of the capacitors Cpu and Cnu. The reactor Lu is connected between the terminal R of the 3-phase alternating current power supply 1 and a connection point of the diodes Dpu and Dnu.

The heretofore described configuration is such that, when the line voltage Vrs of the 3-phase alternating current power supply 1 is of positive polarity, the line voltage Vrs is applied to the reactor Lu owing to the bidirectional switch element Su being turned on, and energy is accumulated in the reactor Lu. Next, when the bidirectional switch element Su is turned off, the capacitor Cpu is charged via the diode Dpu by the energy accumulated in the reactor Lu.

Meanwhile, when the line voltage Vrs of the 3-phase alternating current power supply 1 is of negative polarity, the line voltage Vrs is applied to the reactor Lu owing to the bidirectional switch element Su being turned on, and energy is accumulated in the reactor Lu. Next, when the bidirectional switch element Su is turned off, the capacitor Cnu is charged via the diode Dnu by the energy accumulated in the reactor Lu.

The converter circuit 31 is such that, by the bidirectional switch element Su being caused to carry out a turn on/turn off operation in this way, the voltage of the capacitors Cpu and Cnu can be maintained at a predetermined voltage value higher than the amplitude value of the line voltage Vrs. The bidirectional switch element Su carries out the turn on/turn off operation at a frequency sufficiently higher than the frequency of the 3-phase alternating current power supply 1.

The converter circuit 32 has a circuit configuration symmetrical to that of the converter circuit 31 across a line connecting the terminal S of the 3-phase alternating current power supply 1 and the alternating current output terminal V (third alternating current output terminal). Also, the converter circuit 32 is such that, by an operation the same as that of the converter circuit 31, the voltage of the capacitors Cpw and Cnw is maintained at a predetermined voltage value higher than the amplitude value of the line voltage Vts.

The output terminals Pu, Ou, and Nu of the converter circuit 31, and the output terminals Pw, Ow, and Nw of the converter circuit 32, are connected to each other. Consequently, the voltage of the capacitor Cpu and the voltage of the capacitor Cpw are the same. Also, the voltage of the capacitor Cnu and the voltage of the capacitor Cnw are the same.

The capacitors Cpu and Cnu and capacitors Cpw and Cnw charged to the predetermined voltage function as serially connected direct current power supplies for the inverter circuits 41 and 42. That is, the capacitors Cpu and Cpw correspond to the positive side direct current power supply Psp of the direct current power supply series circuit 3. Also, the capacitors Cnu and Cnw correspond to the negative side direct current power supply Psn of the direct current power supply series circuit 3.

The inverter circuit 41 has the series circuit of the switching elements Q1 and Q2 and the bidirectional switch elements S1 and S2 as main components. The two ends of the series circuit of the switching elements Q1 and Q2 are connected one each to the output terminals Pu and Nu of the converter circuit 31. Also, a connection point of the switching elements Q1 and Q2 is connected to the alternating current output terminal U. The bidirectional switch element S1 is connected between a connection point of the switching elements Q1 and Q2 and the terminal R of the 3-phase alternating current power supply 1. The bidirectional switch element S2 is connected between a connection point of the switching elements Q1 and Q2 and the neutral terminal Ou of the converter circuit 31.

The inverter circuit 42 has a circuit configuration symmetrical to that of the inverter circuit 41 across a line connecting the terminal S of the 3-phase alternating current power supply 1 and the alternating current output terminal V (third alternating current output terminal). Consequently, a description of the connection configuration of the inverter circuit 42 will be omitted.

The heretofore described configuration is such that the inverter circuits 41 and 42 according to the embodiment carry out the region 1 to region 6 operations described using FIG. 3 to FIG. 10, in the same way as the inverter circuit 4 according to the first embodiment. Because of these operations, the advantages produced by the power conversion device according to the embodiment are the same as those produced by the power conversion device according to the first embodiment.

That is, the power conversion device according to the embodiment is such that line voltage Vuv in accordance with the line voltage command Vuv* can be output to the alternating current output terminal U. Also, the power conversion device is such that line voltage Vwv in accordance with the line voltage command Vwv* can be output to the alternating current output terminal W.

Further, when outputting the line voltages, the power conversion device according to the embodiment is such that switching loss can be reduced further than in the case of the power conversion device shown in FIG. 18. Also, the power conversion device according to the embodiment is such that, because of the heretofore described actions, it is possible to reduce loss in, or the size of, the reactors Lf1 and Lf2. Also, the power conversion device according to the embodiment is such that, because of the heretofore described actions, means for detecting an interruption of the 3-phase alternating current power supply 1 is not necessary in the control of outputting the line voltage Vuv and line voltage Vwv.

Also, the inverter circuits 41 and 42 according to the embodiment carry out the region 7 operation described using FIG. 11 and FIG. 12, in the same way as the inverter circuit 4 according to the first embodiment. Because of this operation, the power conversion device according to the embodiment is such that it is possible to further reduce power loss. Also, the power conversion device according to the embodiment is such that it is possible to further reduce loss in the reactors Lf1 and Lf2 in region 7.

Figure 15:
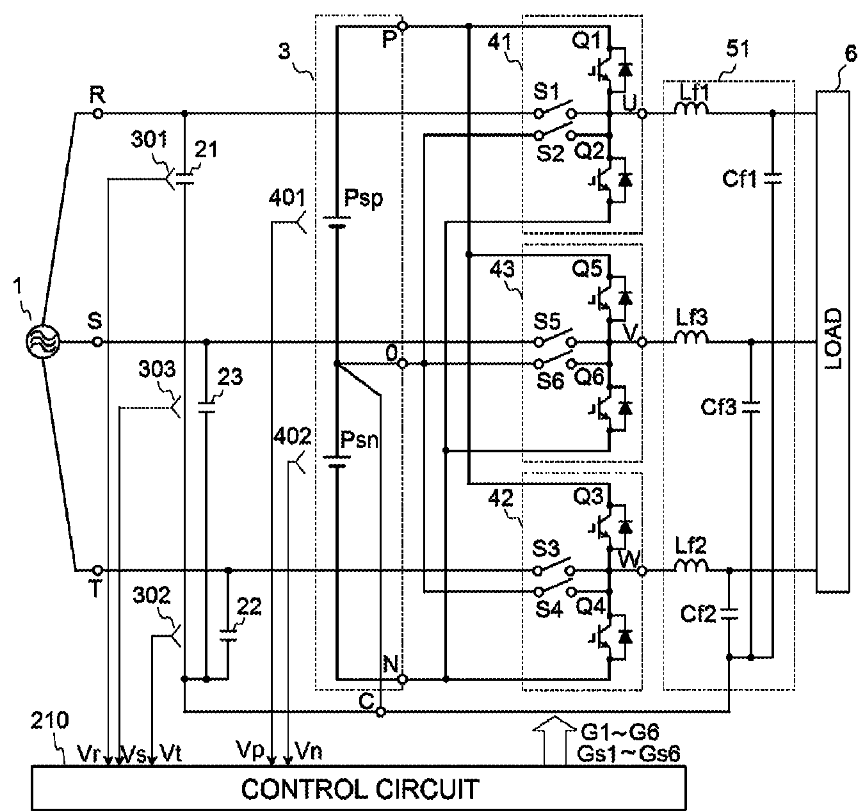
FIG. 15 is a diagram for illustrating a fourth embodiment of the invention.

Next, FIG. 15 is a diagram for describing a fourth embodiment of the power conversion device according to the invention. This power conversion device is such that a neutral point of Y-connected capacitors 21 to 23 and a neutral point of a Y-connected filter circuit 51 are connected by a terminal C. Furthermore, the neutral terminal O of the direct current power supply series circuit is connected to the terminal C. The power conversion device is such that inverter circuits 41 to 43 are Y-connected, and a predetermined 3-phase alternating current voltage is generated. Inputs of the inverter circuits 41 to 43 are the voltage of each phase of the 3-phase alternating current power supply 1 and the voltage of the direct current power supply series circuit 3.

The inverter circuit 41 is an inverter circuit that outputs a U-phase voltage (first phase voltage) to the alternating current output terminal U (first alternating current output terminal). The inverter circuit 42 is an inverter circuit that outputs a W-phase voltage (second phase voltage) to the alternating current output terminal W (second alternating current output terminal). An inverter circuit 43 is an inverter circuit that outputs a V-phase voltage (third phase voltage) to the alternating current output terminal V (third alternating current output terminal).

The inverter circuit 41 has the series circuit of the switching elements Q1 and Q2 and the bidirectional switch elements S1 and S2 as main components. The two ends of the series circuit of the switching elements Q1 and Q2 are connected one each to the output terminals P and N of the direct current power supply series circuit 3. Also, a connection point of the switching elements Q1 and Q2 is connected to the alternating current output terminal U. The bidirectional switch element S1 is connected between a connection point of the switching elements Q1 and Q2 and the terminal R of the 3-phase alternating current power supply 1. The bidirectional switch element S2 is connected between a connection point of the switching elements Q1 and Q2 and the neutral terminal O of the direct current power supply series circuit 3.

The inverter circuit 42 is configured in the same way as the inverter circuit 41 with respect to the terminal T of the 3-phase alternating current power supply 1 and the direct current power supply series circuit 3. The inverter circuit 43 is configured in the same way as the inverter circuit 41 with respect to the terminal S of the 3-phase alternating current power supply 1 and the direct current power supply series circuit 3. Consequently, a description of the connection configuration of the inverter circuits 42 and 43 will be omitted.

The heretofore described configuration is such that the inverter circuits 41 to 43 according to the embodiment carry out the region 1 to region 6 operations described using FIG. 3 to FIG. 10, in the same way as the inverter circuit 4 according to the first embodiment. Because of these operations, the advantages produced by the power conversion device according to the embodiment are the same as those produced by the power conversion device according to the first embodiment.

That is, the power conversion device according to the embodiment is such that phase voltage Vu in accordance with a phase voltage command Vu* (first phase voltage command) can be output to the alternating current output terminal U. Also, the power conversion device is such that phase voltage Vw in accordance with a phase voltage command Vw* (second phase voltage command) can be output to the alternating current output terminal W. Also, the power conversion device is such that phase voltage Vv in accordance with a phase voltage command Vv* (third phase voltage command) can be output to the alternating current output terminal V.

Further, when outputting the phase voltages, the power conversion device according to the embodiment is such that switching loss can be reduced further in the corresponding inverter circuit than in the case of the power conversion device shown in FIG. 18. Also, the power conversion device according to the embodiment is such that, because of the heretofore described actions, it is possible to reduce loss in, or the size of, reactors Lf1 to Lf3. Also, the power conversion device according to the embodiment is such that, because of the heretofore described actions, means for detecting an interruption of the 3-phase alternating current power supply 1 is not necessary in the control of outputting the phase voltages Vu, Vv, and Vw.

Also, the inverter circuits 41 to 43 according to the embodiment carry out the region 7 operation described using FIG. 11 and FIG. 12, in the same way as the inverter circuit 4 according to the first embodiment. Because of this operation, the power conversion device according to the embodiment is such that it is possible to further reduce power loss. Also, the power conversion device according to the embodiment is such that it is possible to further reduce loss in the reactors Lf1 to Lf3 in region 7.

Figure 16:
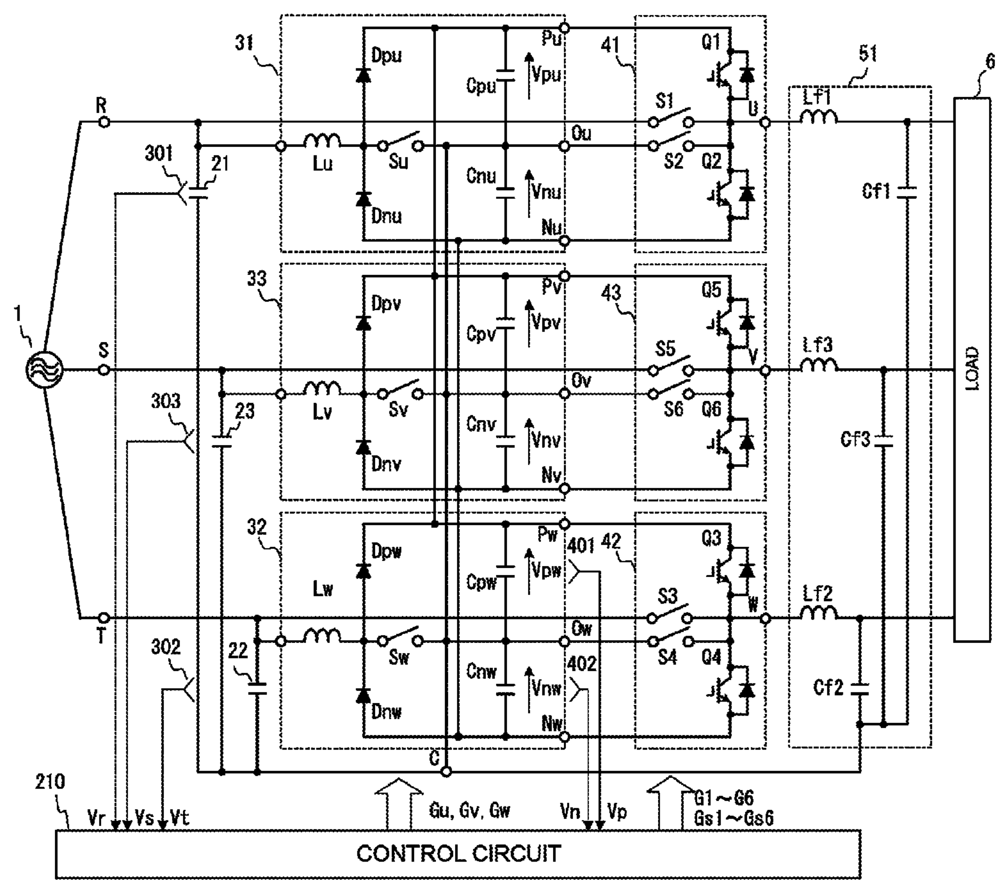
FIG. 16 is a diagram for illustrating a fifth embodiment of the invention.

Next, FIG. 16 is a diagram for describing a fifth embodiment of the power conversion device according to the invention. This power conversion device is such that the direct current power supply series circuit 3 of the power conversion device shown in FIG. 15 is configured of the converter circuit 31 corresponding to the inverter circuit 41, the converter circuit 32 corresponding to the inverter circuit 42, and a converter circuit 33 corresponding to the inverter circuit 43.

The converter circuit 31 has as main components the series circuit of the diode Dpu and diode Dnu, the series circuit of the capacitor Cpu and capacitor Cnu, the bidirectional switch element Su, and the reactor Lu. The positive side terminal of the capacitor Cpu is connected to the positive side output terminal Pu of the converter circuit 31, and the negative side terminal of the capacitor Cnu is connected to the negative side output terminal Nu of the converter circuit 31. Also, a connection point of the capacitors Cpu and Cnu is connected to the neutral terminal Ou of the converter circuit 31, and is connected to the terminal C connected to the neutral point of the Y-connected capacitors 21 to 23 and the neutral point of the Y-connected filter circuit 51. The series circuit of the diodes Dpu and Dnu is connected in parallel with the series circuit of the capacitors Cpu and Cnu. The bidirectional switch element Su is connected between a connection point of the diodes Dpu and Dnu and a connection point of the capacitors Cpu and Cnu. The reactor Lu is connected between the terminal R of the 3-phase alternating current power supply 1 and a connection point of the diodes Dpu and Dnu.

In the heretofore described configuration, the converter circuit 31 is such that, by the bidirectional switch Su being caused to carry out a turn on/turn off operation, the capacitors Cpu and Cnu are charged to a predetermined voltage, in the same way as in the case of the converter circuit 31 according to the third embodiment shown in FIG. 14. The capacitor Cpu and capacitor Cnu charged to the predetermined voltage function as the same kind of power supply for the inverter circuit 41 as the direct current power supply series circuit 3.

The converter circuit 32, having the same kind of circuit configuration as the converter circuit 31, is such that, by the bidirectional switch element Sw being caused to carry out a turn on/turn off operation, the capacitors Cpw and Cnw are charged to a predetermined voltage. The capacitor Cpw and capacitor Cnw charged to the predetermined voltage function as the same kind of power supply for the inverter circuit 42 as the direct current power supply series circuit 3.

The converter circuit 33, having the same kind of circuit configuration as the converter circuit 31, is such that, by the bidirectional switch element Sv being caused to carry out a turn on/turn off operation, the capacitors Cpv and Cnv are charged to a predetermined voltage. The capacitor Cpv and capacitor Cnv charged to the predetermined voltage function as the same kind of power supply for the inverter circuit 43 as the direct current power supply series circuit 3.

The output terminals Pu, Ou, and Nu of the converter circuit 31, the output terminals Pw, Ow, and Nw of the converter circuit 32, and the output terminals Pv, Ov, and Nv of the converter circuit 33, are connected to each other. Consequently, the voltage of each of the capacitors Cpu, Cpv, and Cpw is the same. Also, the voltage of each of the capacitors Cnu, Cnv, and Cnw is the same.

The inverter circuit 41 is an inverter circuit that outputs U-phase voltage to the alternating current output terminal U (first alternating current output terminal). The inverter circuit 42 is an inverter circuit that outputs W-phase voltage to the alternating current output terminal W (second alternating current output terminal). The inverter circuit 43 is an inverter circuit that outputs V-phase voltage to the alternating current output terminal V (third alternating current output terminal).

As the configurations and operations of the inverter circuits 41 to 43 are the same as those of the inverter circuits 41 to 43 according to the fourth embodiment shown in FIG. 15, a description thereof will be omitted. The inverter circuits 41 to 43 according to the embodiment carry out the region 1 to region 6 operations described using FIG. 3 to FIG. 10, in the same way as the inverter circuit 4 according to the first embodiment. Because of these operations, the advantages produced by the power conversion device according to the embodiment are the same as those produced by the power conversion device according to the first embodiment.

That is, the power conversion device according to the embodiment is such that phase voltage Vu in accordance with the phase voltage command Vu* can be output to the alternating current output terminal U. The power conversion device is such that phase voltage Vw in accordance with the phase voltage command Vw* can be output to the alternating current output terminal W. The power conversion device is such that phase voltage Vv in accordance with the phase voltage command Vv* can be output to the alternating current output terminal V.

Further, when outputting the phase voltages, the power conversion device according to the embodiment is such that switching loss can be reduced further in the corresponding inverter circuit than in the case of the power conversion device shown in FIG. 18. Also, the power conversion device according to the embodiment is such that, because of the heretofore described actions, it is possible to reduce loss in, or the size of, the reactors Lf1 to Lf3. Also, the power conversion device according to the embodiment is such that, because of the heretofore described actions, means for detecting an interruption of the 3-phase alternating current power supply 1 is not necessary in the control of outputting the phase voltages Vu, Vv, and Vw.

Also, the inverter circuits 41 to 43 according to the embodiment carry out the region 7 operation described using FIG. 11 and FIG. 12, in the same way as the inverter circuit 4 according to the first embodiment. Because of this operation, the power conversion device according to the embodiment is such that it is possible to further reduce power loss. Also, the power conversion device according to the embodiment is such that it is possible to further reduce loss in the reactors Lf1 to Lf3 in region 7.

Figure 17:
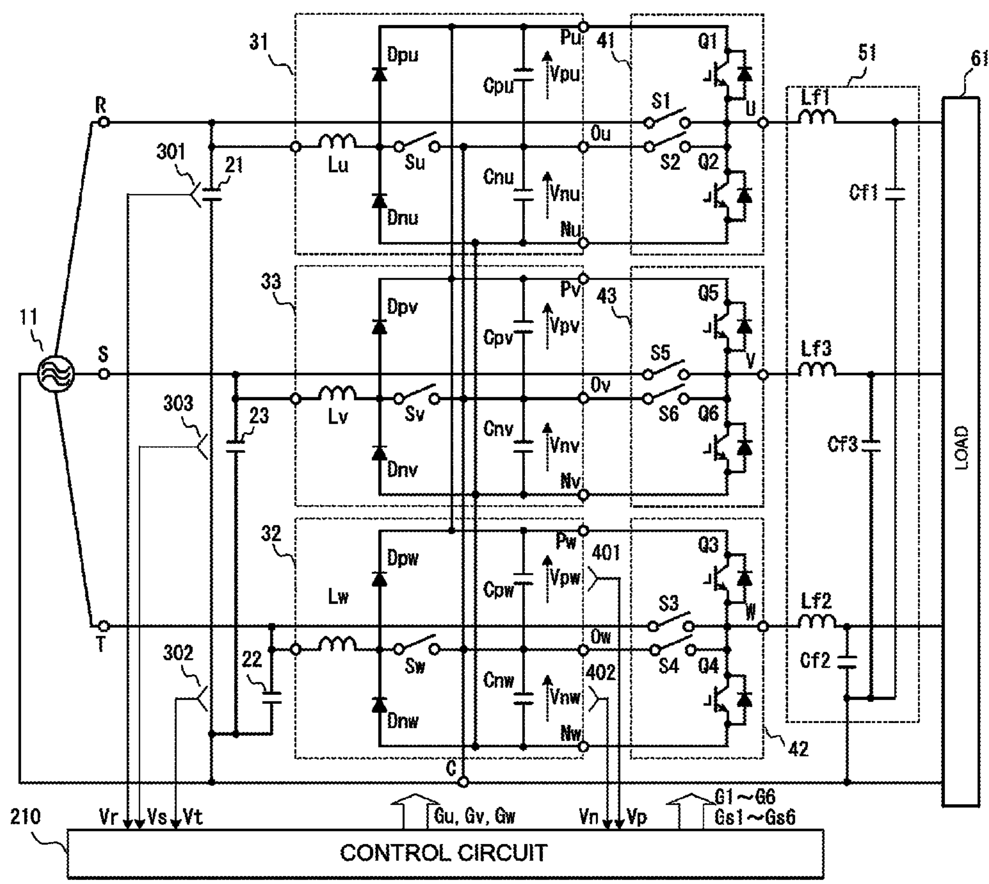
FIG. 17 is a diagram for illustrating a sixth embodiment of the invention.

Next, FIG. 17 is a diagram for describing a sixth embodiment of the power conversion device according to the invention. In this embodiment, the power conversion device according to the embodiment shown in FIG. 16 is applied to a 3-phase 4-wire type 3-phase alternating current power supply 11 and a load 61.

In this embodiment, a neutral point of the 3-phase alternating current power supply 11 and a neutral point of the load 61 are connected to the terminal C, to which are connected neutral terminals of the converters 31 to 33. As other configurations and operations of the power conversion device in the embodiment are the same as those of the power conversion device according to the embodiment shown in FIG. 16, a description thereof will be omitted.

The power conversion device is such that the inverter circuits 41 to 43 carry out the region 1 to region 6 operations described using FIG. 3 to FIG. 10, in the same way as the inverter circuit 4 according to the first embodiment. Because of these operations, the advantages produced by the power conversion device according to the embodiment are the same as those produced by the power conversion device according to the first embodiment.

That is, the power conversion device according to the embodiment is such that phase voltage Vu in accordance with the phase voltage command Vu* can be output to the alternating current output terminal U. The power conversion device is such that phase voltage Vw in accordance with the phase voltage command Vw* can be output to the alternating current output terminal W. The power conversion device is such that phase voltage Vv in accordance with the phase voltage command Vv* can be output to the alternating current output terminal V.

Further, when outputting the phase voltages, the power conversion device according to the embodiment is such that switching loss can be reduced further in the corresponding inverter circuit than in the case of the power conversion device shown in FIG. 18. Also, the power conversion device according to the embodiment is such that, because of the heretofore described actions, it is possible to reduce loss in, or the size of, the reactors Lf1 to Lf3. Also, the power conversion device according to the embodiment is such that, because of the heretofore described actions, means for detecting an interruption of the 3-phase alternating current power supply 11 is not necessary in the control of outputting the phase voltages Vu, Vv, and Vw.

Also, the inverter circuits 41 to 43 according to the embodiment carry out the region 7 operation described using FIG. 11 and FIG. 12, in the same way as the inverter circuit 4 according to the first embodiment. Because of this operation, the power conversion device according to the embodiment is such that it is possible to further reduce power loss. Also, the power conversion device according to the embodiment is such that it is possible to further reduce loss in the reactors Lf1 to Lf3 in region 7.

The invention claimed is:

1. A power conversion device that outputs a 3-phase alternating current voltage based on first and second line voltage commands, the power conversion device comprising:

first, second and third input voltage terminals for receiving first, second and third input voltages from a 3-phase alternating current power supply;

a direct current power supply series circuit supplying positive and negative voltages, wherein the direct current power supply series circuit includes a first direct current power supply and a second direct current power supply connected together in series, a neutral terminal, which is a series connection point of the first direct current power supply and the second direct current power supply, being connected to the third input voltage terminal;

means for selecting a first line voltage from a first voltage group in accordance with a first line voltage command, the first voltage group consisting of a zero voltage with the potential of the neutral terminal, the positive voltage, the negative voltage, and the first input voltage;

means for selecting a second line voltage from a second voltage group in accordance with a second line voltage command, the second voltage group including the zero voltage, the positive voltage, the negative voltage, and the second input voltage; and means for outputting the first line voltage to a first alternating current output terminal, the second line voltage to a second alternating current output terminal, and the third input voltage to a third alternating current output terminal.

2. The power conversion device according to claim 1, wherein the first line voltage command is synchronous with the first input voltage with respect to the third input voltage, and the second line voltage command is synchronous with the second input voltage with respect to the third input voltage.

3. The power conversion device according to claim 1, wherein the first line voltage command is asynchronous with the first input voltage, and the second line voltage command is asynchronous with the second input voltage.

4. The power conversion device according to claim 1, wherein the positive voltage and the negative voltage are both greater than each of the amplitude values of the first line voltage command and the second line voltage command, and the first line voltage command and second line voltage command each have the same amplitude value, and have a phase difference of 120 degrees therebetween.

5. The power conversion device according to claim 1, further comprising:

a first inverter circuit that outputs the first line voltage to the first alternating current output terminal; and a second inverter circuit that outputs the second line voltage to the second alternating current output terminal.

6. The power conversion device according to claim 5, wherein:

the first inverter circuit includes a first switching element series circuit having first and second switching elements connected in series and connected to opposite ends of the direct current power supply series circuit, a series connection point of the first and second switching elements connected to the first alternating current output terminal, a first bidirectional switch element having a first end thereof connected to the first alternating current output terminal and a second end thereof connected to the first input voltage terminal, and a second bidirectional switch element having a first end thereof connected to the first alternating current output terminal and a second end thereof connected to the third input voltage terminal; and the second inverter circuit includes a second switching element series circuit having third and fourth switching elements connected in series and connected to opposite ends of the direct current power supply series circuit, a series connection point of the third and fourth switching elements connected to the second alternating current output terminal, a third bidirectional switch element having a first end thereof connected to the second alternating current output terminal and a second end thereof connected to the second input voltage terminal, and a fourth bidirectional switch element having a first end thereof connected to the second alternating current output terminal and a second end thereof connected to the third input voltage terminal.

7. The power conversion device according to claim 5, wherein:

a plurality of control periods are defined, each having a same predetermined duration and being consecutive with each other, the first line voltage is formed of a first voltage and a second voltage selected in accordance with the first line voltage command from among the voltages included in the first voltage group, the second line voltage is formed of a third voltage and a fourth voltage selected in accordance with the second line voltage command from among the voltages included in the second voltage group, the first inverter circuit outputs each of the first voltage and the second voltage in a complementary way for the predetermined duration to the first alternating current output terminal in each of the control periods, and the second inverter circuit outputs each of the third voltage and fourth voltage in a complementary way for the predetermined duration to the second alternating current output terminal in each of the control periods.

8. The power conversion device according to claim 5, wherein:

a plurality of control periods are defined, each having a same predetermined duration and being consecutive with each other, the first line voltage is formed of a first voltage, among the voltages included in the first voltage group, whose absolute value is a nearest equal or greater value to the absolute value of the first line voltage command, and a second voltage, among the voltages included in the first voltage group, whose absolute value is a nearest smaller value to the absolute value of the first line voltage command, the second line voltage is formed of a third voltage, among the voltages included in the second voltage group, whose absolute value is a nearest equal or greater value to the absolute value of the second line voltage command, and a fourth voltage, among the voltages included in the second voltage group, whose absolute value is a nearest smaller value to the absolute value of the second line voltage command, the first inverter circuit outputs each of the first voltage and the second voltage in a complementary way for the predetermined duration to the first alternating current output terminal in each of the control periods, and the second inverter circuit outputs each of the third voltage and the fourth voltage in a complementary way for the predetermined duration to the second alternating current output terminal in each of the control periods.

9. The power conversion device according to claim 7, wherein:

an output time of the first voltage is fixed based on the first line voltage command, the first voltage, and the second voltage, an output time of the second voltage is a time that is the output time of the first voltage subtracted from the predetermined duration, an output time of the third voltage is fixed based on the second line voltage command, the third voltage, and the fourth voltage, and an output time of the fourth voltage is a time that is the output time of the third voltage subtracted from the predetermined duration.

10. The power conversion device according to claim 7, wherein:

an output time of the first voltage is a time corresponding to a value obtained by dividing the voltage difference between the first line voltage command and second voltage by the voltage difference between the first voltage and second voltage, an output time of the second voltage is a time that is the output time of the first voltage subtracted from the predetermined duration, an output time of the third voltage is a time corresponding to a value obtained by dividing the voltage difference between the second line voltage command and fourth voltage by the voltage difference between the third voltage and fourth voltage, and an output time of the fourth voltage is a time that is the output time of the third voltage subtracted from the predetermined duration.

11. The power conversion device according to claim 7, wherein, during each control period:

a mean value of the first line voltage is equivalent to a mean value of the first line voltage command, and a mean value of the second line voltage is equivalent to a mean value of the second line voltage command.

12. A power conversion device that outputs a 3-phase alternating current voltage based on first to third phase voltage commands, the power conversion device comprising:

first, second and third input voltage terminals for receiving first, second and third input voltages from a 3-phase alternating current power supply;

a direct current power supply series circuit supplying positive and negative voltages, wherein the direct current power supply series circuit includes a first direct current power supply and a second direct current power supply connected together in series, a neutral terminal, which is a series connection point of the first direct current power supply and second direct current power supply, being connected to the third input voltage terminal;

means for selecting a first phase voltage from a third voltage group in accordance with a first phase voltage command, the third voltage group consisting of a zero voltage with the potential of the neutral terminal, the positive voltage, the negative voltage, and the first input voltage;

means for selecting a second phase voltage from a fourth voltage group in accordance with a second phase voltage command, the fourth voltage group consisting of the zero voltage, the positive voltage, the negative voltage, and the second input voltage;

means for selecting a third phase voltage from a fifth voltage group in accordance with a third phase voltage command, the fifth voltage group consisting of the zero voltage, the positive voltage, the negative voltage, and the third input voltage; and means for outputting the first phase voltage to a first alternating current output terminal, the second phase voltage to a second alternating current output terminal, and the third phase voltage to a third alternating current output terminal.

13. The power conversion device according to claim 12, wherein the first phase voltage command is synchronous with the first input voltage, the second phase voltage command is synchronous with the second input voltage, and the third phase voltage command is synchronous with the third input voltage.

14. The power conversion device according to claim 12, wherein the first phase voltage command is asynchronous with the first input voltage of the 3-phase alternating current power supply, the second phase voltage command is asynchronous with the second input voltage, and the third phase voltage command is asynchronous with the third input voltage.

15. The power conversion device according to claim 12, wherein:

the positive voltage and the negative voltage are both greater than each of the amplitude values of the first to third phase voltage commands, and the first phase voltage command, second phase voltage command, and third phase voltage command have the same amplitude value, and each phase voltage command has a phase difference of 120 degrees relative to each other phase voltage command.

16. The power conversion device according to claim 12, further comprising:

a first inverter circuit outputs the first phase voltage to the first alternating current output terminal;

a second inverter circuit outputs the second phase voltage to the second alternating current output terminal; and a third inverter circuit outputs the third phase voltage to the third alternating current output terminal.

17. The power conversion device according to claim 16, wherein:

the first inverter circuit includes a first switching element series circuit, having first and second switching elements connected in series and connected to opposite ends of the direct current power supply series circuit, a series connection point thereof being connected to the first alternating current output terminal, a first bidirectional switch element of which one end is connected to the first alternating current output terminal and the other end is connected to the first input voltage, and a second bidirectional switch element of which one end is connected to the first alternating current output terminal and the other end is connected to the neutral terminal;

the second inverter circuit includes a second switching element series circuit having third and fourth switching elements connected in series and connected to opposite ends of the direct current power supply series circuit, a series connection point thereof being connected to the second alternating current output terminal, a third bidirectional switch element of which one end is connected to the second alternating current output terminal and the other end is connected to the second terminal of the 3-phase alternating current power supply, and a fourth bidirectional switch element of which one end is connected to the second alternating current output terminal and the other end is connected to the neutral terminal of the direct current power supply series circuit; and the third inverter circuit includes a third switching element series circuit having fifth and sixth switching elements connected in series and connected to opposite ends of the direct current power supply series circuit, a series connection point thereof being connected to the third alternating current output terminal, a fifth bidirectional switch element of which one end is connected to the third alternating current output terminal and the other end is connected to the third terminal of the 3-phase alternating current power supply, and a sixth bidirectional switch element of which one end is connected to the third alternating current output terminal and the other end is connected to the neutral terminal of the direct current power supply series circuit.

18. The power conversion device according to claim 17, further comprising:

a 3-phase filter circuit including first, second and third inductors respectively in series with each of the first, second and third alternating current output terminals, and including first, second and third capacitors connected between each of the first, second and third alternating current output terminals and a neutral point of the 3-phase filter circuit, the neutral point of the 3-phase filter circuit connected to the neutral terminal of the direct current power supply series circuit; and a 3-phase capacitor connected to each of the first, second and third terminals of the 3-phase alternating current power supply and having a neutral point connected to the neutral terminal of the direct current power supply series circuit.

19. The power conversion device according to claim 18, wherein the neutral terminal of the direct current power supply series circuit is further connected to a neutral terminal of the 3-phase alternating current power supply and a neutral terminal of a 3-phase load.

20. The power conversion device according to claim 16, wherein:

a plurality of control periods are defined, each having a same predetermined duration and being consecutive with each other, the first phase voltage is formed of a first voltage and a second voltage selected in accordance with the first phase voltage command from among the voltages included in the third voltage group, the second phase voltage is formed of a third voltage and a fourth voltage selected in accordance with the second phase voltage command from among the voltages included in the fourth voltage group, and the third phase voltage is formed of a fifth voltage and a sixth voltage selected in accordance with the third phase voltage command from among the voltages included in the fifth voltage group, wherein the first inverter circuit outputs each of the first and second voltages in a complementary way for the predetermined duration to the first alternating current output terminal, the second inverter circuit outputs each of the third and fourth voltages in a complementary way for the predetermined duration to the second alternating current output terminal, and the third inverter circuit outputs each of the fifth voltage and sixth voltages in a complementary way for a predetermined duration to the third alternating current output terminal.

21. The power conversion device according to claim 16, wherein:

a plurality of control periods are defined, each having a same predetermined duration and being consecutive with each other, the first phase voltage is formed of a first and a second voltage, among the voltages included in the third voltage group, an absolute value of the first voltage being a nearest equal or greater value to the absolute value of the first phase voltage command, an absolute value of the second voltage being a nearest smaller value to the absolute value of the first phase voltage command, the second phase voltage is formed of a third voltage and a fourth voltage, among the voltages included in the fourth voltage group, the absolute value of the third voltage being a nearest equal or greater value to the absolute value of the second phase voltage command, an absolute voltage of the fourth voltage being a nearest smaller value to the absolute value of the second phase voltage command, and the third phase voltage is formed of a fifth voltage and a sixth voltage, among the voltages included in the fifth voltage group, the absolute value of the fifth voltage being a nearest equal or greater value to the absolute value of the third phase voltage command, an absolute value of the sixth voltage being a nearest smaller value to the absolute value of the third phase voltage command, wherein the first inverter circuit outputs each of the first voltage and the second voltage in a complementary way for the predetermined duration to the first alternating current output terminal, the second inverter circuit outputs each of the third voltage and the fourth voltage in a complementary way for the predetermined duration to the second alternating current output terminal, and the third inverter circuit outputs each of the fifth voltage and the sixth voltage in a complementary way for the predetermined duration to the third alternating current output terminal.

22. The power conversion device according to claim 20, wherein:

an output time duration of the first voltage is fixed based on the first phase voltage command, the first voltage, and the second voltage, an output time duration of the second voltage is a time that is the output time duration of the first voltage subtracted from the time of the respective control period, an output time duration of the third voltage is fixed based on the second phase voltage command, the third voltage, and the fourth voltage, an output time duration of the fourth voltage is a time that is the output time duration of the third voltage subtracted from the time of the respective control period, an output time duration of the fifth voltage is fixed based on the third phase voltage command, the fifth voltage, and the sixth voltage, and an output time duration of the sixth voltage is a time that is the output time duration of the fifth voltage subtracted from the time of the respective control period.

23. The power conversion device according to claim 20, wherein:

an output time duration of the first voltage is a time corresponding to a value obtained by dividing the voltage difference between the first phase voltage command and second voltage by the voltage difference between the first voltage and second voltage, an output time duration of the second voltage is a time that is the output time duration of the first voltage subtracted from the time of the respective control period, an output time duration of the third voltage is a time corresponding to a value obtained by dividing a voltage difference between the second phase voltage command and fourth voltage by a voltage difference between the third voltage and fourth voltage, an output time duration of the fourth voltage is a time that is the output time duration of the third voltage subtracted from the time of the respective control period, an output time duration of the fifth voltage is a time corresponding to a value obtained by dividing a voltage difference between the third phase voltage command and sixth voltage by the voltage difference between the fifth voltage and sixth voltage, and an output time duration of the sixth voltage is a time that is the output time of the fifth voltage subtracted from the time of the respective control period.

24. The power conversion device according to claim 20, wherein, in each control period:

a mean value of the first phase voltage is equivalent to a mean value of the first phase voltage command, a mean value of the second phase voltage is equivalent to a mean value of the second phase voltage command, and a mean value of the third phase voltage is equivalent to a mean value of the third phase voltage command.

25. A power conversion device that outputs a 3-phase alternating current voltage based on at least one voltage command, the power conversion device comprising:

first, second and third input voltage terminals for receiving first, second and third input voltages from a 3-phase alternating current power supply;

a direct current power supply circuit supplying a positive and a negative voltage;

means for selecting at least one output voltage from a voltage group in accordance with the at least one voltage command, the voltage group consisting of a zero voltage, the positive voltage, the negative voltage, and a predetermined one of the first, second and third input voltages, and means for outputting the at least one output voltage to a respective first, second or third alternating current output terminal.

* * * * *